(12) United States Patent
Aggarwal

(10) Patent No.: US 12,493,491 B2
(45) Date of Patent: Dec. 9, 2025

(54) METHOD AND APPARATUS FOR REAL-TIME TASK SCHEDULING FOR NON-PREEMPTIVE SYSTEM

(71) Applicant: SAMSUNG ELECTRONICS CO., LTD., Suwon-si (KR)

(72) Inventor: Harsh Aggarwal, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 18/130,186

(22) Filed: Apr. 3, 2023

(65) Prior Publication Data

US 2023/0251900 A1    Aug. 10, 2023

Related U.S. Application Data

(63) Continuation of application No. PCT/KR2021/004934, filed on Apr. 20, 2021.

(51) Int. Cl.
*G06F 9/48* (2006.01)
*G06F 9/54* (2006.01)

(52) U.S. Cl.
CPC ............ *G06F 9/4887* (2013.01); *G06F 9/542* (2013.01)

(58) Field of Classification Search
CPC ...... G06F 1/329; G06F 9/4843; G06F 9/4881; G06F 9/4887; G06F 9/52; G06F 9/526; G06F 9/528
See application file for complete search history.

(56) References Cited

U.S. PATENT DOCUMENTS

| | | | |
|---|---|---|---|
| 6,657,987 B1 | 12/2003 | Kumar et al. | |
| 7,877,752 B2 | 1/2011 | Neuman | |
| 11,030,001 B2 * | 6/2021 | Baldocchi | ................. G06F 9/48 |
| 2003/0061260 A1 | 3/2003 | Rajkumar | |
| 2006/0101465 A1 | 5/2006 | Kato et al. | |
| 2006/0115267 A1 | 6/2006 | Kesselman et al. | |
| 2007/0083871 A1 | 4/2007 | McKenney | |

(Continued)

FOREIGN PATENT DOCUMENTS

| | | |
|---|---|---|
| CN | 104182180 A | 12/2014 |
| KR | 10-1958112 B1 | 7/2019 |
| KR | 10-1960609 B1 | 7/2019 |

OTHER PUBLICATIONS

Communication dated Sep. 4, 2023, issued by the European Patent Office in counterpart European Application No. 21892053.6.

(Continued)

*Primary Examiner* — Andy Ho
(74) *Attorney, Agent, or Firm* — Sughrue Mion, PLLC

(57) ABSTRACT

A method of scheduling a Real Time (RT) task, includes: receiving a task; obtaining a yield time of the RT task based on one of an execution deadline of the RT task, an execution deadline of next RT task subsequent to the RT task, and a maximum execution time associated with an execution of the next RT task subsequent to the RT task; creating a bandwidth reservation task having a deadline; inserting the RT task along with the bandwidth reservation task into a RT wait queue based on the deadline of each of the RT task and the bandwidth reservation task in accordance with an Early Deadline First (EDF) criteria; and scheduling an unscheduled task based on an available-time of the RT wait queue in accordance with the EDF based scheduling.

20 Claims, 37 Drawing Sheets

(56) References Cited

U.S. PATENT DOCUMENTS

| | | |
|---|---|---|
| 2010/0088706 A1 | 4/2010 | Dong et al. |
| 2012/0079486 A1 | 3/2012 | Brandt et al. |
| 2013/0290970 A1 | 10/2013 | Shah et al. |
| 2014/0351819 A1 | 11/2014 | Shah et al. |
| 2015/0293793 A1 | 10/2015 | Vrind et al. |
| 2015/0378782 A1 | 12/2015 | Hks et al. |
| 2018/0336064 A1 | 11/2018 | Alrashed et al. |
| 2018/0365062 A1 | 12/2018 | Roberts et al. |

OTHER PUBLICATIONS

C. L. Liu, "Scheduling Algorithms for Multiprogramming in a Hard-Real-Time Environment," Journal of the Association for Computing Machinery, vol. 20, No. 1, pp. 46-61, Jan. 1973.

Communication dated Feb. 20, 2025, issued by the European Patent Office in counterpart European Application No. 21892053.6.

TimeGraph-GPU Scheduling for Real-Time Multi-Tasking Environments, (Jun. 2011), 448 pages.

Facchinetti, T., et al., Non-Preemptive Interrupt Scheduling for Safe Reuse of Legacy Drivers in Real-Time Systems, (Jul. 2005), 8 pages.

Capodieci, N., et al., "Deadline-based Scheduling for GPU with Preemption Support", (2005) 12 pages. https://ieeexplore.ieee.org/document/8603197.

Abeni, L., et al., "Integrating Multimedia Applications in Hard Real-Time Systems" (1998), 10 pages. https://ieeexplore.ieee.org/document/739726/.

Deadline scheduling part 1—overview and theory, EDF (Early Deadline First), (2018), 7 pages. https://lwn.net/Articles/743740.

Indian Office Action issued from Intellectual Property India on Nov. 12, 2020 to Indian Application No. 202011049499.

International Search Report (PCT/ISA/210) issued from the International Searching Authority on Jul. 30, 2021 to International Application No. PCT/KR2021/004934.

Written Opinion (PCT/ISA/237) issued from the International Searching Authority on Jul. 30, 2021 to International Application No. PCT/KR2021/004934.

\* cited by examiner

METHOD AND APPARATUS FOR REAL-TIME TASK SCHEDULING FOR NON-PREEMPTIVE SYSTEM

CROSS-REFERENCE TO RELATED APPLICATIONS

This application is a by-pass continuation application of International Application No. PCT/KR2021/004934, filed on Apr. 20, 2021, which based on and claims priority to Indian Patent Application No. 2020011049499, filed on Nov. 12, 2020, in the Indian Intellectual Property Office, the disclosures of which are incorporated by reference herein in their entireties.

BACKGROUND

1. Field

The present disclosure relates to a method and an apparatus for Real-Time (RT) task scheduling for a non-preemptive system. In particular, the present disclosure is directed to a scheduling of mixed set of tasks by bandwidth reservation in non-preemptive systems.

2. Description of Related Art

In computing systems, an Operating System (OS) provides an interface between a user and computer hardware. An OS performs all the basic tasks like file management, memory management, process management, handling input and output devices, interrupts, and controlling various peripheral devices and the like. Now, based on a type, the OS may be defined as 1) General Purpose OS (GPOS) and 2) Real Time Operating System (RTOS).

Scheduling is a method by which a task is assigned to resources that complete the work. In particular, the scheduling is done based on various operations like Completely Fair Scheduling (CFS), Round Robin (RR), Deadline scheduler and the like. Based on the adapted scheduling mechanism/operations, the tasks are scheduled. The task may be virtual computation elements such as threads, processes or data flows, which are in turn scheduled onto hardware resources such as processors, network links or expansion cards.

Tasks may be further classified as a Real-Time (RT) task and a Non-Real time (NRT) task. As an example, the RT task has hard timelines. For example, a task resulted from any RT systems like Air Traffic Control Systems, Networked Multimedia Systems, and Command Control Systems etc. The NRT tasks are not associated with a timing constraint.

A scheduler carries out all scheduling activity to keep all computer resources busy and allow multiple-users to share system resources effectively, or to achieve a target quality of service. The scheduler is an integral-part of the computing system that offers multitasking.

Further, a preemptive system, such as RTOS, can support both RT/NRT tasks. Thus, based on a system and an operating system, RT/NRT tasks are scheduled. Now, RTOS usually adapts scheduling operations that support preemption. The preemptive scheduling operations are based on a priority where a scheduler may preempt a low priority running process anytime when a high priority process enters into a ready state. This process is called as context switching.

For example, the RTOS are generally available for hardware that supports preemption, like CPU. In general, the preemption is one of the basic mechanisms that facilitate the embodiment of scheduling concepts.

However, a non-preemptive system, such as GPOS, supports only NRT task. The GPOS usually adapts scheduling operations that support non preemption. Non-preemptive operations are designed so that once a process enters the running state, it cannot be preempted until it completes its allotted time. For example, computing units, such as Graphics Processing Unit (GPU), Network Processing Unit (NPU), and Digital Signal Processor (DSP), are mostly non-preemptive systems. These non-preemptive systems do not support scheduling of hard real-time applications that are constrained by a deadline. In other words, a running task in non-preemptive systems (e.g., NPU/GPU) cannot be interrupted by a higher priority task. Thus, RT scheduling is absent in the non-preemptive systems. Thus, existing NPU/GPU system cannot support RT Multi-Task Environment.

Thus, the computing units (such as GPU/NPU/DSP), which are based on the GPOS do not support scheduling like RTOS (e.g., a deadline scheduling). The non-preemptive scheduling of the compute unit is allocated to a specific process. The process that keeps the compute unit busy will release the compute unit by either switching context or terminating. In other words, the non-preemptive scheduling occurs when a process voluntarily enters the wait state or terminates. The non-preemptive systems can be used for various and diverse hardware platforms as the non-preemptive systems do not need specialized hardware (for example, a timer) like preemptive scheduling.

More specifically, as a part of non-preemptive systems, the GPOS based systems (such as an NPU driver) comprises an interaction between NPU hardware and software and schedules task requests using Fixed Priority Scheduling. The same GPOS based systems provide only fair scheduling or accelerate a particular application. Fixed priority queue can only prioritize and the fixed priority queue is not re-usable. The fixed priority queue provides low NPU utilization.

Accordingly, all NPU requests are scheduled in an order of arrival times; the earliest arrival is scheduled first in accordance with First-In-First-Out (FIFO). With respect to a mixed task scheduling, the soft RT task can be scheduled at its arrival, which causes RT tasks to miss deadlines.

FIG. 1 illustrates a problem in the related art's scheduling. For example, a scheduler implementing a FIFO technique is considered. In FIG. 1, at time T, a request for a first RT task $T_B$ comes. Thus, as the scheduler NPU was idle at time T, the task $T_B$ was schedule for $\Delta T_B$ time. Further, an RT task like Task A for job 3 i.e. A3 has an arrival time of T3 and a deadline of D3. However, the task A3 is not scheduled and tends to miss its deadline D3. One of the possible reasons can be a long run time of the task $T_B$. Thus, one of the problems that arise in the non-preemptive systems can be that any RT task with a long enough run time can cause a deadline miss for another RT task. Further, the fixed priority queue can only prioritize and is not re-usable. The fixed priority queue provides low NPU utilization.

Overall, in non-preemptive systems of the related art, there is no concept of a deadline required to support RT applications. The same cannot guarantee RT application with stringent timing requirements. The state of the art schedulers are limited by hardware support for preemption and unable to interrupt a running task by scheduling a higher priority task. In a case that multiple applications are executed, even a lower priority application can be scheduled, which may cause a missed timing for higher priority applications.

Overall, in non-preemptive systems of the related art, higher RT priority applications may not be guaranteed for their executions without missed timings. In a case of the fixed priority scheme, there is low-utilization and an inability to handle request pertaining to dynamic arrival times.

SUMMARY

According to an aspect of the disclosure, a method for scheduling Real Time (RT) task by an electronic device comprising a scheduler, includes: receiving, by a scheduler, a task request from an operating system (OS) runtime, the task request being defined by at least one RT task to be queued based on an enqueue-event trigger; obtaining, by the scheduler, a yield time of the at least one RT task based on at least one of an execution deadline of the at least one RT task, an execution deadline of next RT task subsequent to the at least one RT task, and a maximum execution time associated with an execution of the next RT task subsequent to the at least one RT task. The method also includes creating, by the scheduler, a bandwidth reservation task having a deadline defined by the yield time for timing execution of the next RT task subsequent to the at least one RT task, the bandwidth reservation task being non-executable and being defined by a null execution time; inserting, by the scheduler, the at least one RT task along with the bandwidth reservation task into a RT wait queue based on the deadline of each of the at least one RT task and the bandwidth reservation task in accordance with an Early Deadline First (EDF) criteria for enabling an EDF based scheduling; and scheduling, by the task scheduler, an unscheduled task based on an available-time of the RT wait queue in accordance with the EDF based scheduling.

According to an aspect of the disclosure, an electronic device includes a processor and a scheduler coupled to the processor. The scheduler is configured to: receive, from an OS runtime, a task request defined by at least one RT task to be queued based on an enqueue event trigger; obtain a yield time of the at least one RT task based on at least one of an execution deadline of the at least one RT task, an execution deadline of next RT task subsequent to the at least one RT task, and a maximum execution time associated with the execution of the next RT task subsequent to the at least one RT task, create a bandwidth reservation task having a deadline defined by the yield time for timing execution of the next RT task subsequent to the at least one RT task, the bandwidth reservation task being non-executable and defined by a null execution time; insert the at least one RT task along with the bandwidth reservation task into a RT wait queue based on the deadline of each of the at least one RT task and the bandwidth reservation task in accordance with an EDF criteria for enabling an EDF based scheduling; and schedule an unscheduled task based on an available time of the RT wait queue in accordance with the EDF based scheduling.

The embodiment of the present disclosure renders a Reservation Bandwidth server (RBS) that implements the feature of reservation tasks to provide a-priori guarantee for hard Real-Time (RT) task. The same renders a method to reserve bandwidth based on yield time for hard RT tasks instead of a budget so that it can work without any preemption support.

The embodiment of the present disclosure prioritizes hard RT applications and serves them predictably with a-priori guarantee. Dynamic arrival times are efficiently and reliably handled using Early Deadline First (EDF) with RBS by event (interrupt) driven scheduling. Priority Inversion for running soft RT tasks along with RT tasks in slack time for high throughput increasing Network Processing Unit (NPU) utilization.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
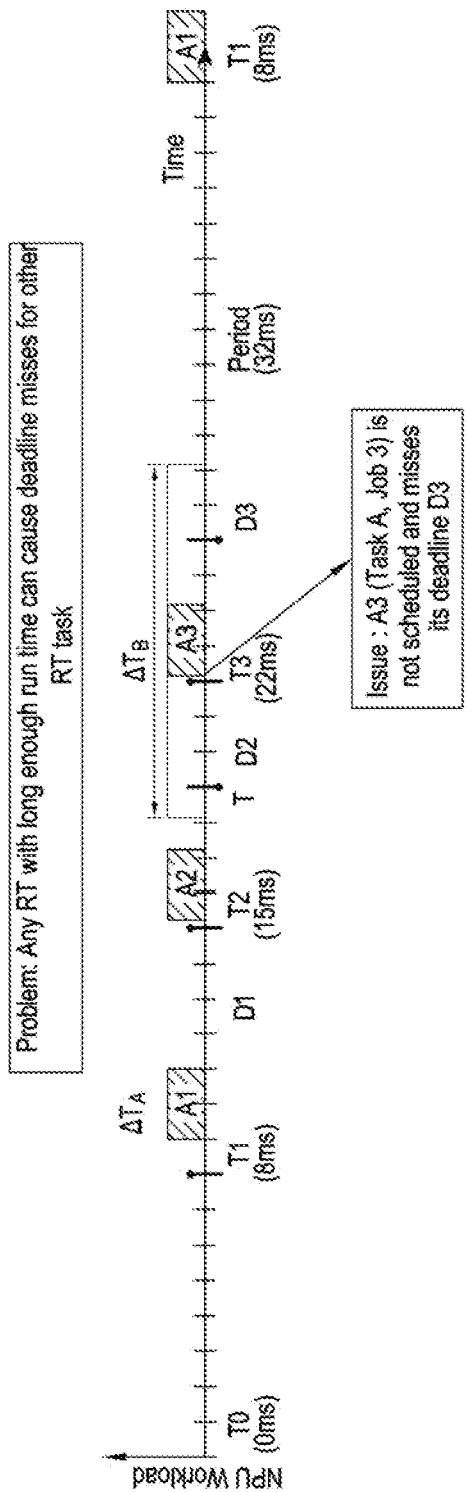
FIG. 1 illustrates a scenario in the related art.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

Although embodiments of the present disclosure are illustrated below, the present disclosure may be implemented or embodied using any number of techniques, whether currently known or in existence. The present disclosure should in no way be limited to the embodiments, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art. Embodiments of the present disclosure will be described below in detail with reference to the accompanying drawings.

Figure 2:
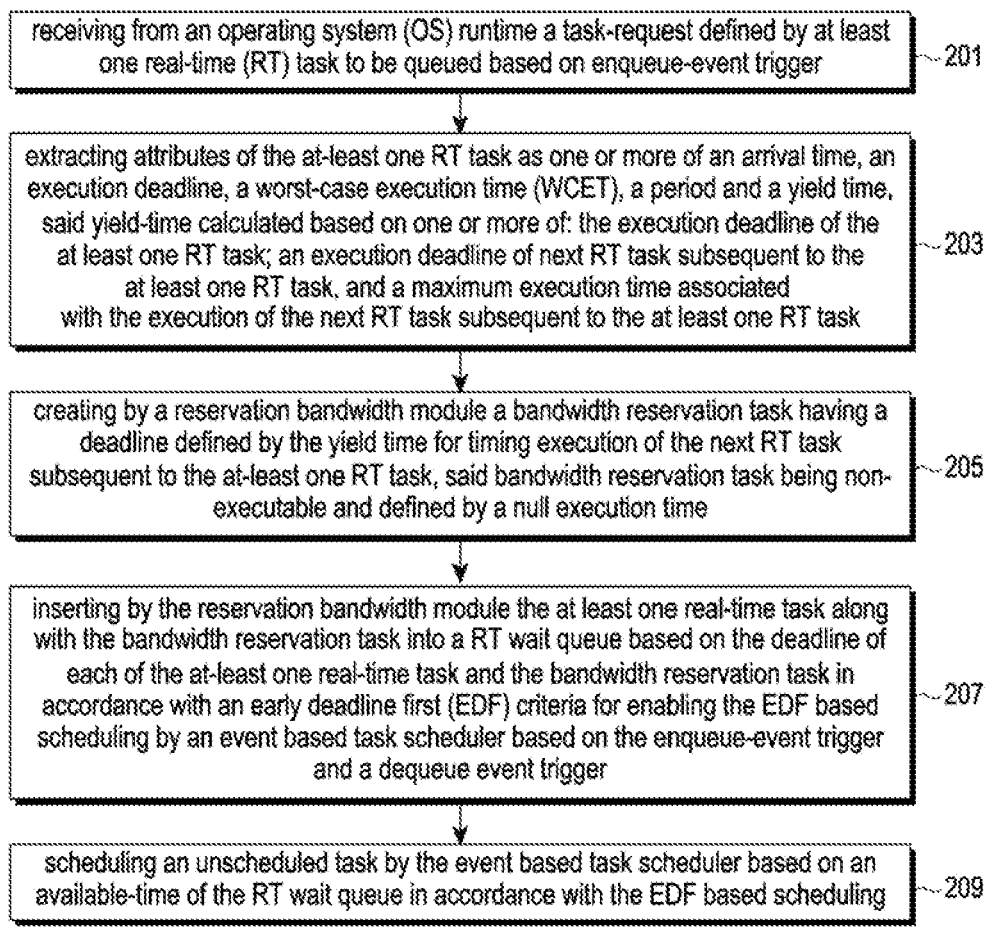
FIG. 2 illustrates method-operations in accordance with an embodiment of the present disclosure.

FIG. 2 illustrates method-operations in accordance with an embodiment of the present disclosure. In an embodiment as depicted in FIG. 2, an embodiment of the present disclosure refers to a method of Real-Time (RT) task scheduling for a non-preemptive system.

Operation 201 of the method 200 recites receiving operation from an Operating System (OS) runtime a task-request defined by at least one RT task to be queued based on an enqueue-event trigger.

In operation 203, based on the task-request, an attribute of the at least one RT task is extracted operation as one or more of an arrival time, an execution deadline, a Worst-Case Execution Time (WCET), a period, and a yield time.

As an example, the yield time is calculated based on one or more of the execution deadline of the at least one RT task, an execution deadline of next RT task subsequent to the at least one RT task and a maximum execution time associated with the execution of the next RT task subsequent to the at least one RT task.

In operation 205, a reservation bandwidth module creates a bandwidth reservation task having a deadline defined by the yield time for timing execution of the next RT task subsequent to the at least one RT task. The bandwidth reservation task is a non-executable and defined by a null execution time. The bandwidth reservation task is associated with the at least one RT task within the RT wait queue and defined by one or more of: an arrival time identical to the at least one RT task, a null execution time, and a deadline corresponding to a sum of an arrival time of the at least one RT task, the execution deadline of the at least one RT task, and the yield time.

In one embodiment, upon receiving the enqueue-event trigger, the reservation bandwidth module creates another bandwidth reservation task by updating the bandwidth reservation task associated with preceding sub-tasks within the same RT task. A given RT Task having n-subtasks (n>=1) may reserve only single reservation task that is further updated. In this context, the unscheduled task may be referred to as a different application task. The another bandwidth reservation task is computed by determining another yield time for the at least one next RT task and updating the deadline of bandwidth reservation task with the another yield time for defining the deadline of the another bandwidth reservation task.

In operation 207, the method 200 inserts the at least one RT task along with the bandwidth reservation task into a RT wait queue based on the deadline of each of the at least one RT task and the bandwidth reservation task in accordance with an Early Deadline First (EDF) criteria for enabling the EDF based scheduling by an event based task scheduler based on the enqueue-event trigger and a dequeue event trigger.

In operation 209, the method recites scheduling an unscheduled task by the event based task scheduler based on an available-time of the RT wait queue in accordance with the EDF based scheduling.

In one embodiment, the insertion of the at least one RT task along with the bandwidth reservation task into the RT wait queue for EDF based scheduling. The insertion of the at least one RT further enables the event based task scheduler for scheduling the at least one RT task in accordance with the execution deadline of the at least one task within the RT wait queue. Thereafter, another unscheduled RT/NRT enqueue task-request may be dynamically received for scheduling the unscheduled task, which may include another RT task or a NRT from the OS runtime.

The unscheduled task request arrives at an instant corresponding to one or more of the reservation-task, expired bandwidth reservation task, updated bandwidth reservation task within the wait queue. In one embodiment, the RT or NRT task arriving at such instant corresponding to the bandwidth reservation task within the RT wait queue corresponds to an executable task not present within the RT wait queue and thereby corresponding to an unscheduled task.

Thereafter, with respect to the unscheduled task, a priority inversion is executed within an available time of the RT wait queue. The priority inversion is executed by scheduling the another unscheduled RT task within the available time of the RT wait queue if the execution deadline of the another RT task elapses before the deadline associated with the bandwidth reservation task. The available time of the RT wait queue is defined by a slack time of the EDF returned bandwidth reservation task based on running EDF at that event on the Real Time-Wait Queue (RT-WQ), which provides an available time based on the chosen task reflecting a) an unscheduled task or b) a reservation task.

In other words, the available time of the RT wait queue is defined by a time of arrival of the unscheduled-task request triggered by the enqueue event or a current time in a case of the dequeue-event. The arrival task is computed based on: a) a slack-time of the bandwidth reservation task; and b) a deadline associated with the unscheduled task. The unscheduled task is returned by running EDF at that event on the RT-WQ, which provides available time based on the chosen task reflecting a) an unscheduled RT task or b) a reservation task.

In one embodiment, the method 200 receives from the OS runtime a task-request defined by at least one NRT) task to be queued based on enqueue-event trigger and inserting the at least one NRT task in an NRT wait queue for scheduling execution of the NRT task based on a time of arrival of the NRT task or a worst-case execution time of the NRT task.

In one embodiment, the task scheduler receives the RT wait queue and the NRT wait queue from the reservation bandwidth module. The task scheduler may defined as a RT task scheduler/mixed task scheduler for a non-preemptive system and hereinafter referred to as a 'task scheduler.' Thereafter, the tasks within the RT wait queue are scheduled in accordance with the EDF scheduling.

The scheduling for the RT wait queue further includes applying priority inversion for scheduling one or more schedulable tasks in an available time of the RT wait queue as determined by a current time and from the event trigger corresponding to one of an enqueue or dequeue event.

The available time is delimited by an occurrence of the bandwidth reservation task within the RT wait queue. The schedulable task corresponds to the unscheduled task. The RT wait queue is a priority based wait queue having a prioritization of tasks defined by an earlier deadline in accordance with EDF scheduling criteria. Thereafter, the at least one scheduled RT task or the one or more schedulable task associated with the available time are submitted for processing to a processing driver. In one embodiment, optionally, the at least one scheduled RT task is cancelled upon determining the at least one scheduled RT task as being non-schedulable in accordance with the deadline associated with the at least one scheduled RT task.

Thereafter, the tasks within the NRT wait queue are scheduled based on a sequence within the NRT wait queue and based on the at least one scheduled NRT task is submitted for processing to the processing driver. In one embodiment, optionally, the at least one scheduled NRT task is cancelled upon determining the at least one scheduled NRT task as being non-schedulable in accordance with a corresponding maximum tardiness time associated with the NRT task.

In one embodiment, the submission of tasks based on the RT wait queue includes applying EDF scheduling criteria upon the RT wait queue to ascertain a current task within the RT wait queue. Thereafter, the current task within the RT wait queue is identified as the at least one RT task. The at least one RT task is submitted to the processing driver based on a feasibility of scheduling. The feasibility at least defined by conformance with the execution deadline of the at least one RT task.

In another embodiment, the submission of tasks based on the RT wait queue includes applying EDF scheduling criteria upon the RT wait queue to ascertain a current task within the RT wait queue. Thereafter, the current task within the RT wait queue is identified as the bandwidth reservation task. Based on the current task within the RT wait queue, as a part of priority inversion, the schedulable RT task or the schedulable NRT task are submitted for execution by the processing driver within the available time of the RT wait queue. In a case the schedulable task has an execution deadline before an elapse of the yield time associated with the bandwidth reservation task and in a case of absence of the schedulable RT tasks and the NRT tasks, a 'NIL' task is submitted within the available time of the RT wait queue.

In yet another embodiment, the scheduling of tasks within the NRT wait queue includes scheduling the at least one NRT task based on a non-EDF based scheduling criteria associated with the NRT wait queue. The non-EDF based scheduling is defined by one or more of Shortest Job First or FIFO and submitting the at least one scheduled NRT task for processing to the processing driver.

In one embodiment, the at least submitted RT and/or NRT task is processed by the processing driver through a processor hardware unit. Then, a task-completion based interrupt is received from the processor hardware unit and an interrupt handler forming a part of the processing driver is invoked, thereby raising a task dequeue trigger by the processing driver to the task scheduler based on the invocation of the interrupt handler. The trigger signaling corresponds to a completed execution of the submitted task and triggers the even based task scheduler for selecting next task for submission as one or more of the bandwidth reservation task in the RT wait queue, an unscheduled RT task, an unscheduled NRT task, the next RT task in the RT wait queue, and the next NRT task in the NRT wait queue.

The method 200 further includes determining an actual completion time of each completed task by a task profiler forming a part of the task scheduler. The completion time corresponds to a difference between a scheduled time of the completed task and a finish time of the completed task. Then, the completion time of each completed task is logged by the task profiler and one or more parameters of the task scheduler are optimized optimizing for further scheduling of the RT and NRT task based on the logged completion time.

Figure 3:
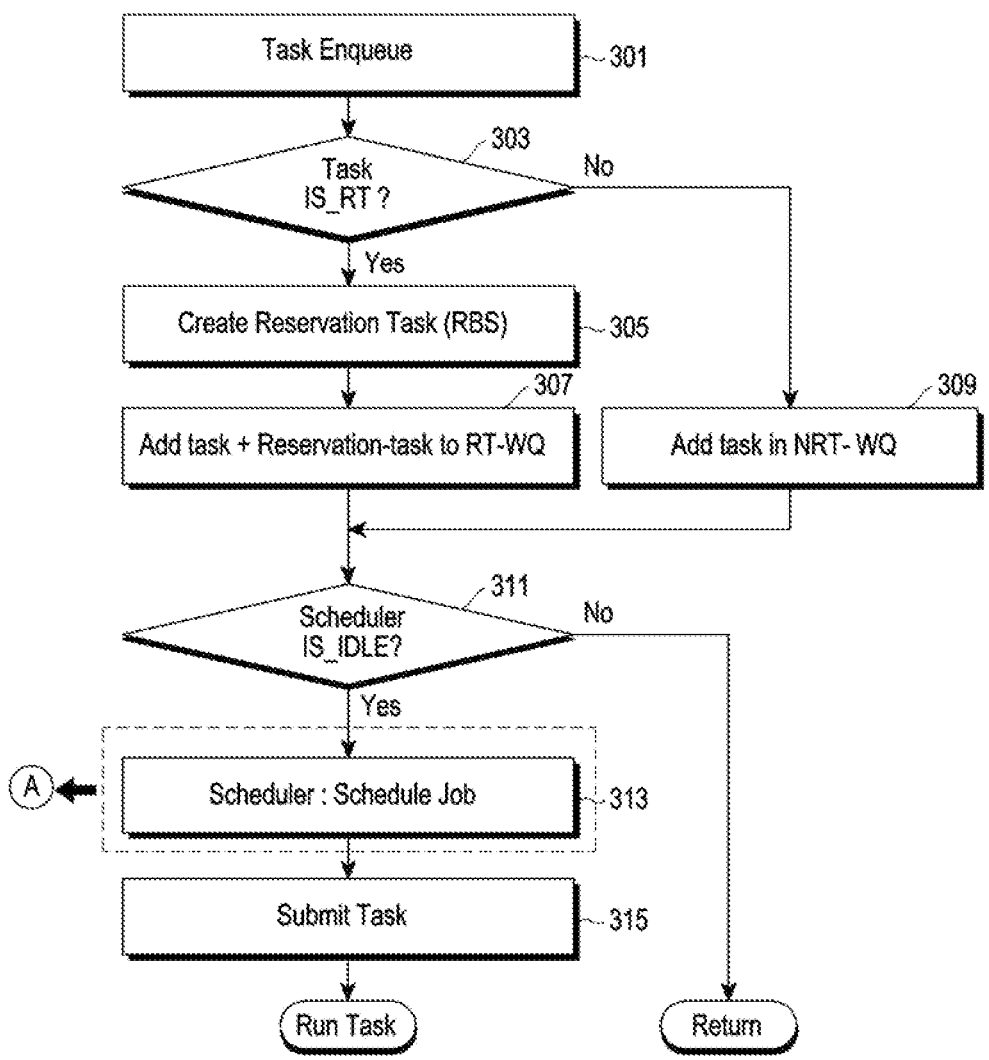
FIG. 3 illustrates an embodiment of the method-operations of FIG. 2, in accordance with an embodiment of the present disclosure.

FIG. 3 illustrates a detailed embodiment of the method 200 as explained in FIG. 2, in accordance with an embodiment of the present disclosure, and accordingly, refers to a method for RT scheduling for a non-preemptive systems. As an example the, the method 300 is performed at a computing system 1600 shown at FIG. 16.

Figure 16:
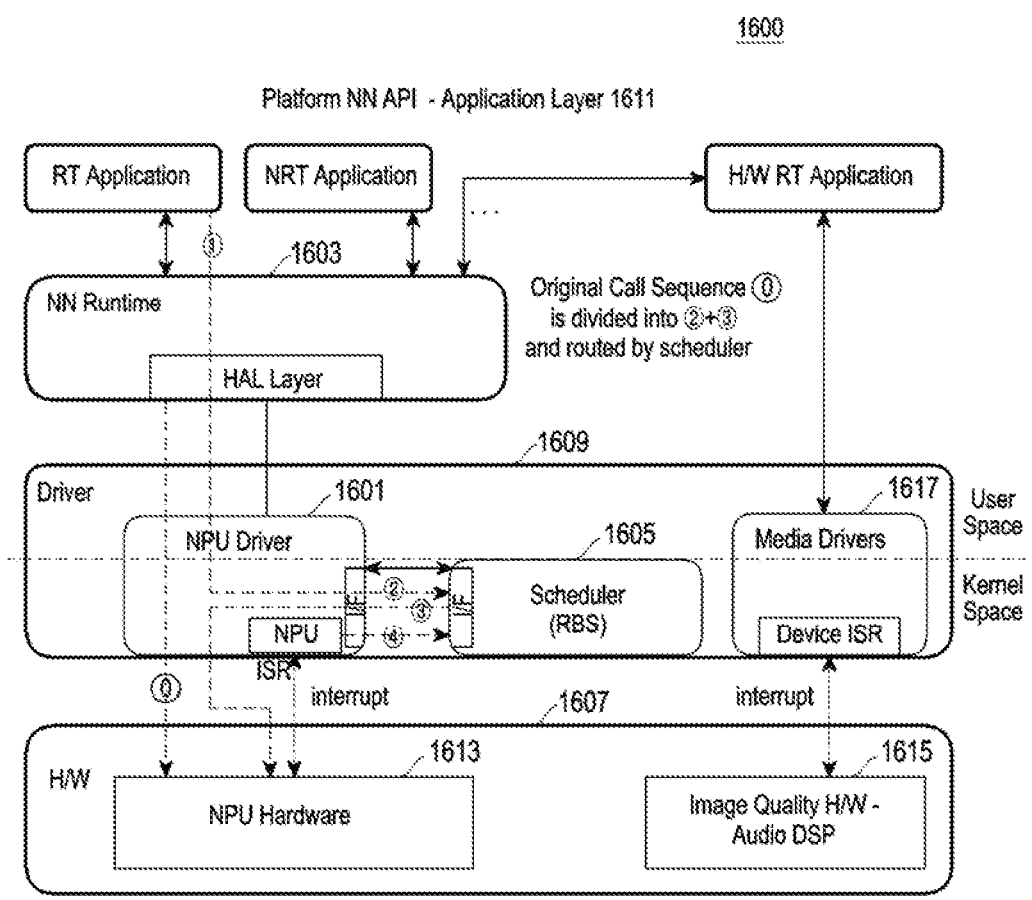
FIG. 16 illustrates an embodiment of the method-operations of FIG. 2, in accordance with an embodiment of the present disclosure.

At operation 301, an initialization of the task is carried out. Initially, an enqueue event trigger is received from a NN runtime 1603 of the computing system 1600 as shown in FIG. 16. As an example, the enqueue event can be trigger based on an occurrence of any event. Based on the triggered enqueue event, an NPU driver 1601 (as shown in FIG. 16) processes the task request of enqueuing the received task request from NN runtime 1603. For doing so, the NPU driver 1601 calls "task Enqueue" of the scheduler kernel interface to provide the task to the scheduler 1605. The block 301 corresponds to the operation 201 of FIG. 2 as explained above.

At operation 303, it is evaluated if the task in hand is an RT task. If yes, then the control flow proceeds to operation 305

At operation 305, which corresponds to the operations 203 and 205, the computing system 1600 extracts attributes of the at least one RT task. In particular, the extraction of attributes may include, for example, arrival time, an execution deadline, a WCET, a period, and a yield time. The operation 305 has been elaborated with respect to FIG. 4 and thereafter, the description of FIG. 3 resumes with respect to operation 305 and subsequent operations.

Figure 4:
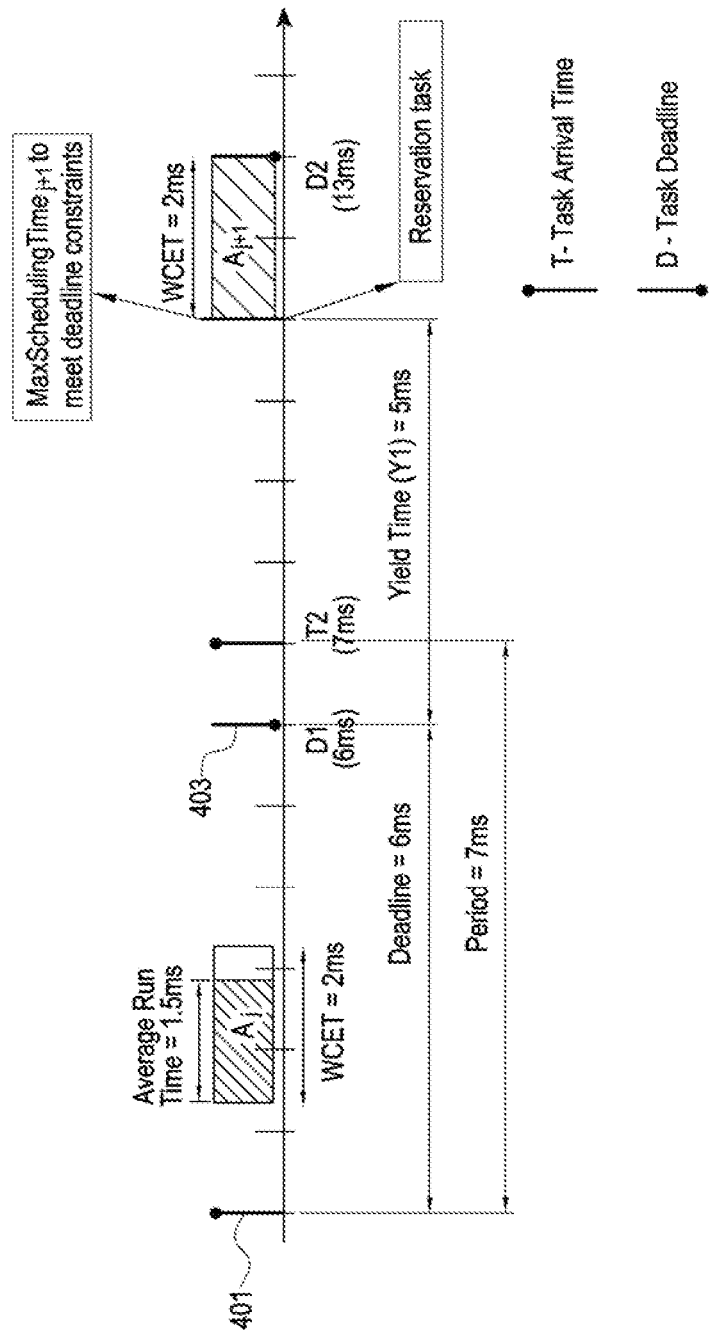
FIG. 4 illustrates a reservation task generation in accordance with an embodiment of the present disclosure.

FIG. 4 illustrates an example scenario for various attributes of a task. The arrival time of the task may be depicted by the reference numeral 401 of the sub-task $A_j$ and defined a time when the task arrives. The execution deadline or a task deadline may be depicted by the reference numeral 403 of the sub-task $A_j$ and defined as a time by which a RT task must finish execution.

Further, the WCET may be defined as a maximum time taken by a task to execute completely on the computing unit. Thus, for example, as shown in FIG. 4, WCET is 2 ms for the sub-task $A_j$. An inter-job time may be defined as Inter-arrival time between consecutive tasks. For example, the inter-job time between the sub-task $A_j$ and the sub-task $A_{j+1}$ is 7 ms.

As another example, the yield time may be defined as a difference between $(j+1)^{th}$ worse case scheduling time and $j^{th}$ deadline. Thus, the next task maximum schedulable time offset from current task deadline is provided by the following expression:

$$\text{arrival}_j + \text{deadline}_j + \text{yieldTime}_j = \text{MaxSchedulingTime}_{j+1} \quad (1)$$

The above-mentioned process of extraction and calculation of various attributes corresponds to the block 203 of FIG. 2.

Continuing with the description of operation 305, a reservation task is created with a deadline equaling the summation of a task deadline and a task yield time ($D_{resv}$=D+Y). As an example, the reservation task may alternately be termed as a bandwidth reservation task in the description without deviating from the scope of the present disclosure. The bandwidth reservation task may be configured by the reservation bandwidth server (RBS) 1605 or a reservation bandwidth module 1605. For each RT Task, the RBS 1605 additionally inserts one reservation task with the below attributes: Deadline$_{resv}$=Deadline$_j$+YieldTime$_j$. Using this reservation task, a temporal isolation can be provided and ensures RT Task schedulability. The bandwidth reservation task is a non-executable task defined by null execution time and acting as barrier with deadline calculated from yield time.

$$D_{resv}=D1+Y1 \quad (2)$$

For example, from FIG. 4, the reservation task $D_{resv}$ is calculated 6+5=11 ms. Also, the deadline is 6 ms and the yield time $(Y_1)$ is 5 ms.

The forthcoming description of FIG. 5 to FIG. 8 further elaborates the description of the operation 305. Thereafter, the description of FIG. 3 resumes with respect to the operation 307 and subsequent operations.

In another example, a task A having 'N' subtasks may be considered where N=3, as also later depicted in FIG. 6. Accordingly, a task A task has 3 subtasks (N=3). $A_{ij}$ may be a sequence as shown below with respect to the task A and includes sub-tasks as follows:

$$(A_{11}, A_{12}, A_{13}) \ldots (A_{i1}, A_{i2}, A_{i3}) \ldots$$

A period may be defined as a different inter-arrival between the same sub-tasks. The period is 32 ms, i.e. a difference $A_{21}-A_{11}$, $A_{22}-A_{12}$, or, in other words, a difference between $A_{(i+1)j}-A_{ij}$.

Figure 5A:
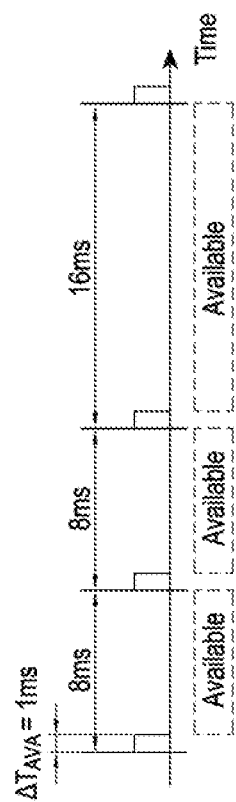
FIGS. 5A and 5B illustrates a priority inversion mechanism, according to an embodiment of the present disclosure.

Accordingly, if N=1,
then Y=P−W
else Y=$D_{i(j+1)}-D_{ij}-W$
wherein,
P=Period
$Y_j$=Yield time
$D_{j+1}$=Deadline of next job
$W_{j+1}$=WCET of next job
$D_j$=Deadline for next job FIG. 5A refers a yield time visualization of the tasks (RT/NRT), and thereby, illustrates that a yield (available) time is also periodic. The RBS 1605 (as shown in FIG. 16) uses a reservation task to reflect this time for its logic.

In a system having m RT ($\tau_{rt}$) and n NRT ($\tau_{nrt}$) NRT Mixed Tasks, an $i^{th}$ ($\tau_{rt}$ periodic RT Task) having j sub-tasks may be considered. For example, Artificial Intelligence (AI) Sound (AIS) may be such an $i^{th}$ task and 3 subtasks (j=0, 1, 2). Accordingly, as shown in FIG. 5A, the yield (available) time is also periodic. The RBS 1605 uses reservation task to reflect this time for its logic.

Figure 5B:
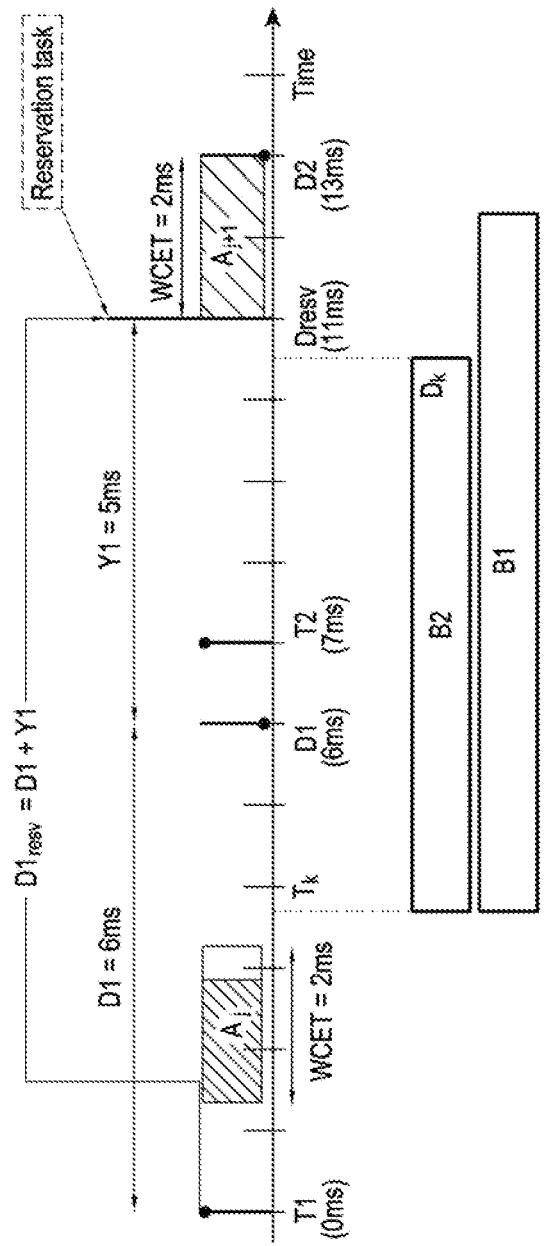

FIG. 5B shows an example diagram for a mixed task set scheduling using RBS, according to an embodiment of the present disclosure. At T=T1, $A_j$ arrives with a deadline D1 and a yield time Y1 [Task Attributes]. Then, the RBS 1605 inserts a reservation task with a deadline=$D_{resv}$ in RT-WQ $D_{resv}$=D1+Y1 and WCET~=0. These reservation tasks are not executable and acts as a barrier. If any task arrives in an interval (T1, T2), an interval with a deadline $D_k$ RBS-scheduler schedule tasks ($D_k < D_{resv}$) can be scheduled.

For example, the task B2 is schedulable by RBS, but the task B1 is not. By way of the reservation task, a need for preemption and a reserve bandwidth for the upcoming task can be removed. For each RT the task RBS only inserts one (1) reservation task, $(j+1)^{st}$ task will update a reservation task deadline added by $j^{th}$ task, so at a time, only one advance reservation is added.

Figure 6:
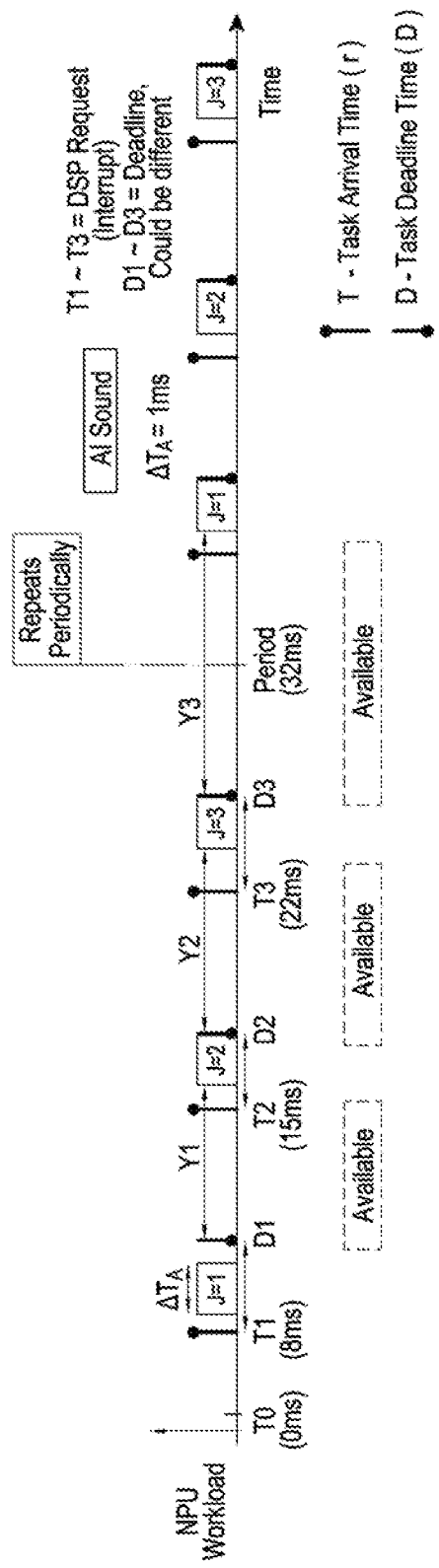
FIG. 6 illustrates a working scenario, according to an embodiment of the present disclosure.

FIG. 6 illustrates an example diagram for a yield time calculation, according to an embodiment of the present disclosure. A yield time, which reflects the 'Available' Time required for RBS, is calculated herein. A task has attributes like a WCET, a period, a deadline, which are known for any real time scheduler like an EDF algorithm. The yield time for RBS can be calculated by the followings:

$$Y_j = D_{j+1} - W_{j+1} - D_j \quad (3)$$

Where, the $Y_j$=yield time
$D_{j+1}$=a deadline of next job
$W_{j+1}$=WCET of next job
$D_j$=Deadline for next job In FIG. 6, the AIS task includes 3 periodic subtasks. Each subtask has a relative deadline of 2 ms and a period of 32 ms for a WCET of 1 ms. For example,
J1 arrival sequence at 8, 40, 72, 104 . . . .
J2 arrival sequence at 5, 47, 79, 111 . . . .
J3 arrival sequence at 22, 54, 86, 118 . . . .

Thus, the yield time from the above equation (3) can be calculated and hence, an absolute yield time (2nd last column) at 16, 23, 41, 48, 55, and 73 is calculated as shown in table 1.

TABLE 1

Task Attributes (In milliseconds)

| AIS | | | | | | Absolute Yield Time = | Yield Time = (Absolute |
| Request (J) | SubtaskID | WCET (w) | Period (p) | Deadline (d) | Arrival Time (r) | Absolute Deadline D = (r + d) | D(j + 1) − W(j + 1) − D(j) | Yield Time − Arrival Time) |
|---|---|---|---|---|---|---|---|---|
| 1 | J1 | 1 | 32 | 2 | 8 | 10 | 16 | 6 |
| 2 | J2 | 1 | 32 | 2 | 15 | 17 | 23 | 6 |
| 3 | J3 | 1 | 32 | 2 | 22 | 24 | 41 | 17 |
| 4 | J1 | 1 | 32 | 2 | 40 | 42 | 48 | 6 |
| 5 | J2 | 1 | 32 | 2 | 47 | 49 | 55 | 6 |
| 6 | J3 | 1 | 32 | 2 | 54 | 56 | 73 | 17 |

The time stamps reflect yield/available Time. The RBS 1605 inserting reservation task with the deadlines is described in detail in the forthcoming description of FIGS. 7 and 8.

Figure 7:
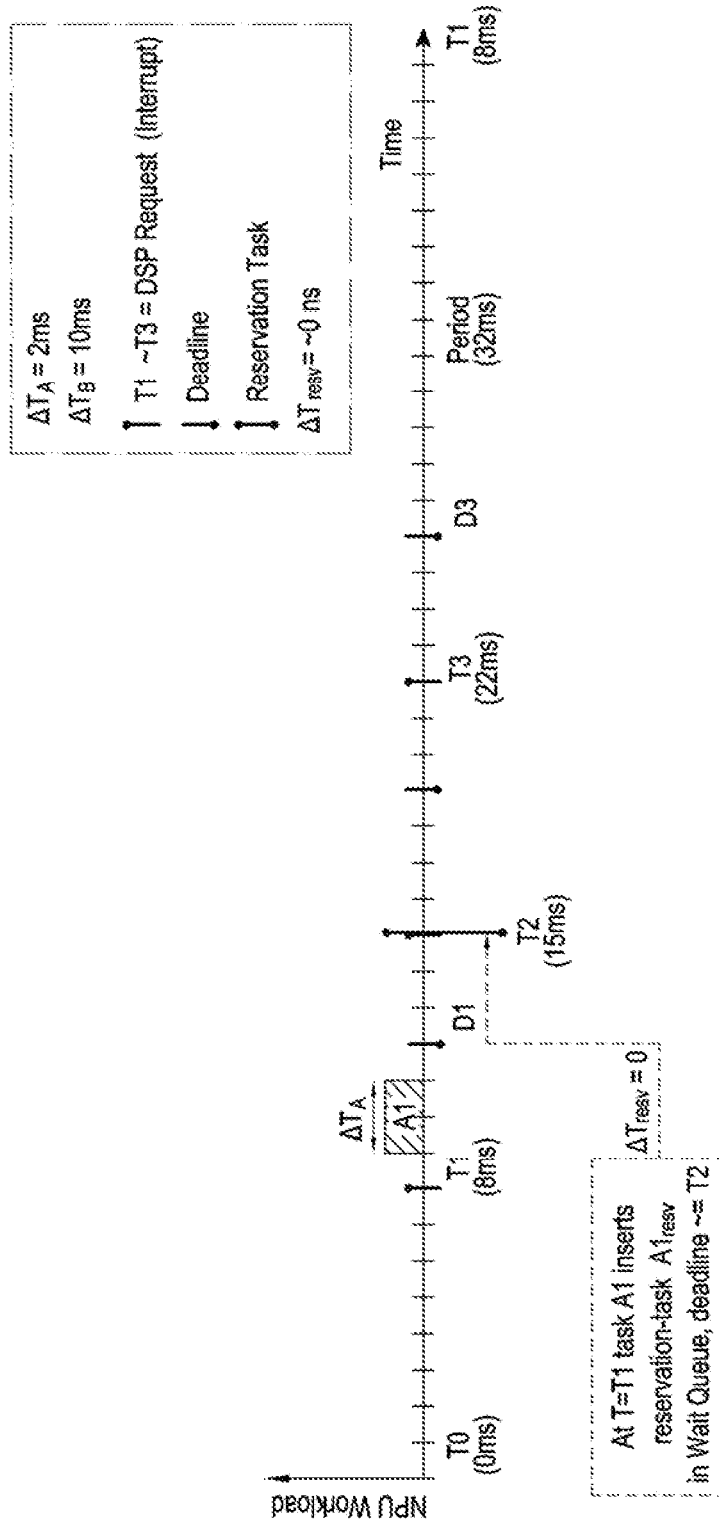
FIG. 7 illustrates another working scenario after FIG. 6, according to an embodiment of the present disclosure.
Figure 8:
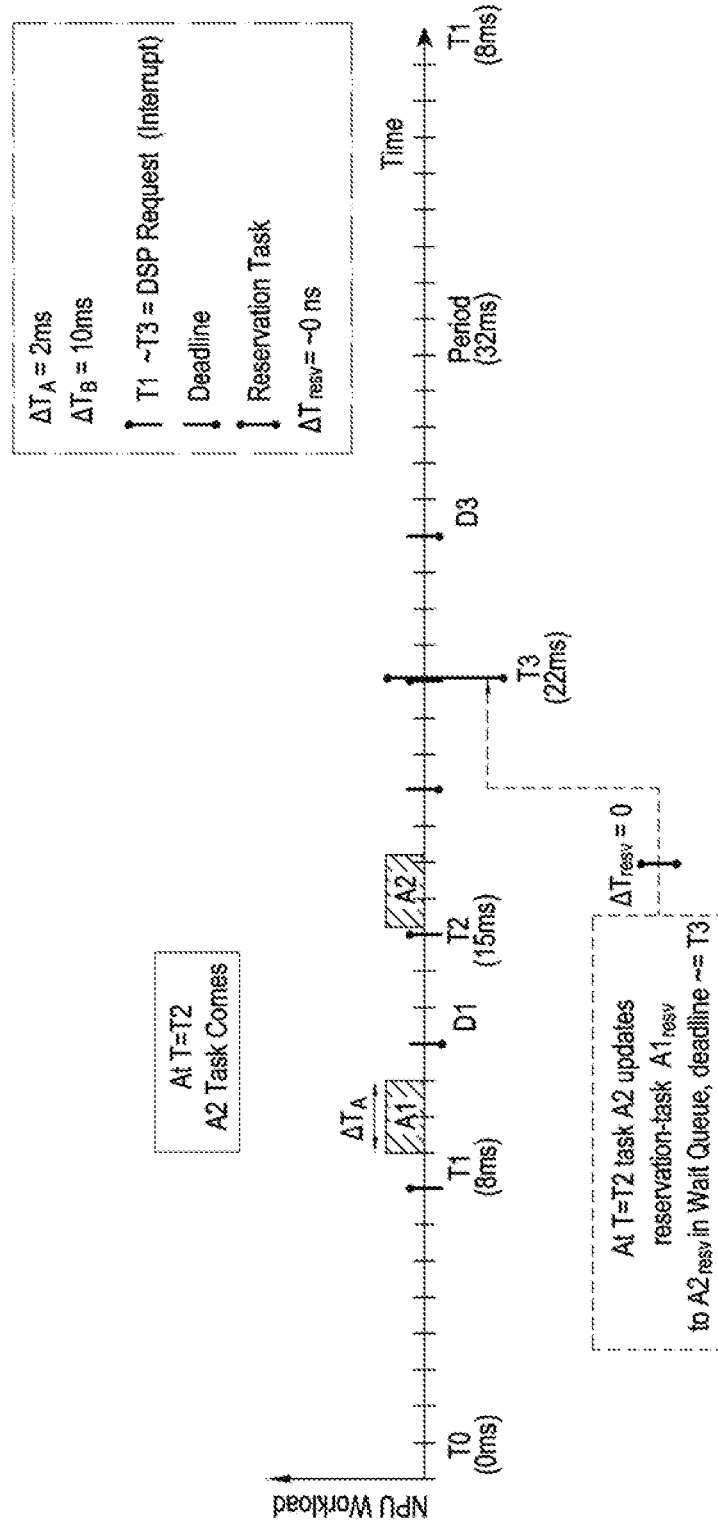
FIG. 8 illustrates another working scenario after FIG. 7, in accordance with an embodiment of the present disclosure.

FIGS. 7 and 8 illustrate various example diagrams based on an RBS scheduler, according to an embodiment of the present disclosure. FIG. 7 illustrates an example scenario wherein at T=T1, the task A1 inserts reservation-task A1resv in Wait Queue, with deadline=T2. FIG. 8 illustrates an example scenario wherein at T=T2, A2 Task arrives. Accordingly, at T=T2, the task A2 updates reservation-task $A1_{resv}$ to $A2_{resv}$ in Wait Queue with deadline=T3

Referring back the description of FIG. 3, with respect to operation 307, the scenario corresponds to a phase post reservation-task creation. Upon having created the reservation task, the RBS 1605 inserts or adds at least one RT task along with the bandwidth reservation task into an RT wait queue based on the deadline of each of the at least one RT task and the bandwidth reservation task in accordance with an EDF criteria for enabling the EDF based scheduling by an event based task scheduler based on the enqueue-event trigger and a dequeue event trigger.

In particular, if the task had a prior reservation task, its deadline is updated. The RBS 1605 maintains that only one reservation task is present for one task (one for task that includes all subtasks). The task and the reservation task are then inserted into the respective RT wait Queue. The present operation 307 corresponds to operation 207 of FIG. 2

In one embodiment, at block 309 of FIG. 3, had it been determined at the block 303 that the task is an NRT task, then they are directly added to Non-Real Time Wait Queue (NRT-WQ). No reservation task is added for NRT tasks. The insertion of the at least one NRT task in an NRT wait queue for scheduling execution of the NRT task is based on a time of arrival of the NRT task or a WCET of the NRT task.

So, once the tasks have been added to respective queues, the control transfers to operation 313 via operation 311, which may be referred to as 'a schedule job'. According to an embodiment of the present disclosure, the computing system 1600 utilizes a multi (e.g., two (2)) level Hierarchical scheduler for a non-preemptive computing unit, as later depicted in FIG. 9. The scheduler 1605 at the operation 313 has two priority work queues: RT-WQ and NRT-WQ. These queues will hold all pending tasks and the scheduler will pick a suitable task for submitting to run on computing unit.

Figure 9:
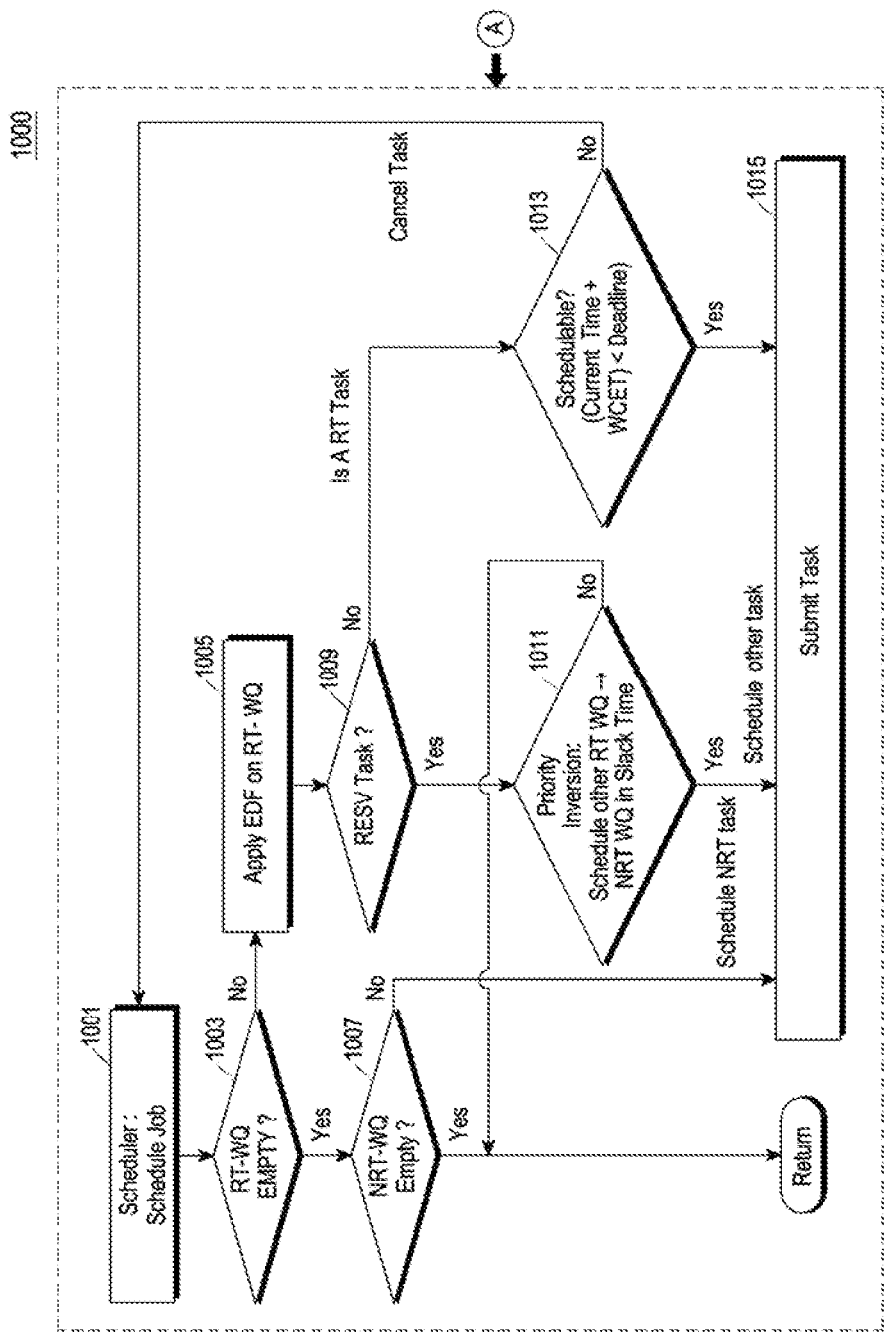
FIG. 9 illustrates an embodiment of the method-operations of FIG. 2, in accordance with an embodiment of the present disclosure.
Figure 17:
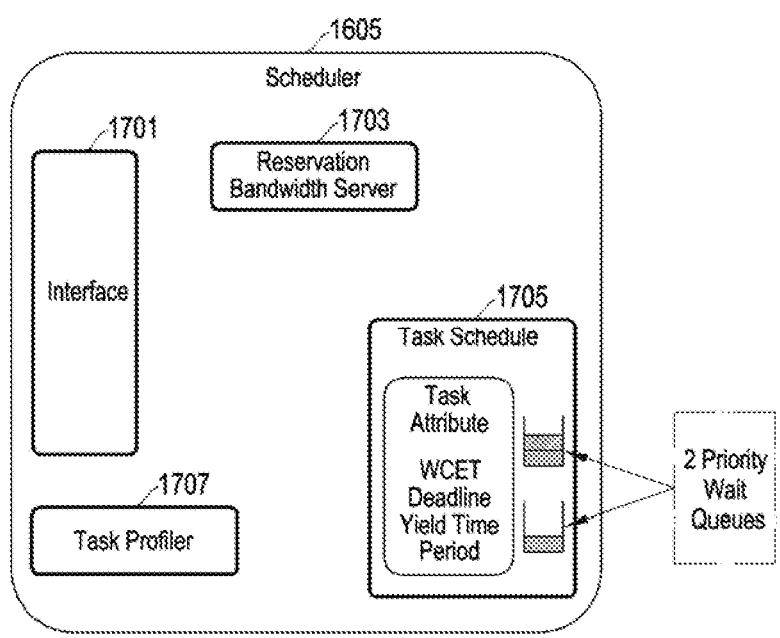
FIG. 17 illustrates yet another embodiment of the method-operations of FIG. 2, in accordance with an embodiment of the present disclosure.

Accordingly as further referred in FIG. 9 and description of FIG. 17 and FIG. 18, at block 313, the scheduler 1605 schedule the job. The scheduler 1605 finds an optimal task by a hierarchical logic. The optimal task can be an RT Task, an NRT Task, or even 'none'. 'None' means pending jobs does not fit in the yield (available) time, so the flow finishes.

Since the scheduler is event driven, the task in this case will be chosen later when a NPU Interrupt comes. However, if a 'schedulable' job is found, the 'Submit Task' submits the task back to NPU driver. The NPU driver then runs the job. The NPU Interrupt will mark the completion of Job (Task Dequeue Interface). Thus, if the schedulable job is found, then the process moves to execute or submit the task at the block 315. Further, if it is found that RT-WQ is empty, then the scheduler will move to execute the hierarchical scheduling, as shown in FIG. 9.

Overall, the insertion of the at least one RT task along with the bandwidth reservation task into the RT wait queue for EDF based scheduling corresponds to FIG. 3 and the hierarchal scheduling as performed will be explained in detail in the description of FIG. 9.

FIG. 9 illustrates a first and a second level scheduling processes of the scheduler 1605, according to an embodiment of the present disclosure. The second level scheduling process is 1000 is performed by the scheduler 1605 of the computing system 1600. As explained above, at block 313, if it is found that RT-WQ is empty then the scheduler will move to execute NRT-WQ. In principle, a two-level scheduling may be executed as follows.

Priority Pass or first level scheduling: Process wait queue based on Priority in order of $Priority_{RT}$>$Priority_{NRT}$ [Wait Queue]

Second Pass or a second level scheduling: Scheduler applies 'scheduling scheme'

For RT-WQ: Apply EDFF or

For NRT-WQ: Apply Shortest Job First/FIFO

At block 1003, the scheduler 1605 determines whether the RT WQ is empty or not. If it is determined that RT WQ is not empty, then the "Priority Pass" representing the first level scheduling comes into action. The scheduler 1605 applies (operation 1005) an EDF on the RT-WQ to find a suitable task. It was further determined whether the chosen task has a reservation task (operation 1009). If the is determined that the chosen task is an RT task, then it is further determined whether the RT task is schedulable or not, at the block 1013.

If the task is schedulable, i.e., if its deadline can be satisfied, then the task is submitted or run at block 1015. Else if the task retrieved is a reservation task, it means a bandwidth is reserved by a high priority task. In this 'available/slack time' the scheduler tries to submit other schedulable task provided, it doesn't affect other deadline thus priority inversion takes place (operation 1011) as corresponding to the operation 209 of FIG. 2. Hence, the RBS Scheduler 1605 provides optimal utilization (a priority inversion case), and hence, another task is submitted or run (at operation 1015).

Now, in a case that RT WQ is empty, but NRT WQ is not empty (operation 1007), then the second pass representing the second level scheduling comes into action at operation 1007. The scheduler 1605 uses NRT-WQ and applies a different policy ('Shortest Job First/FIFO') to find a schedulable job and submits the schedulable job to the NPU driver. If both are empty or no optimal schedulable task is returned, the scheduler's state is set to idle.

Overall, the operations 1003 and 1007 correspond to the priority pass or the first level scheduling, while the remaining operations in FIG. 9 (such as 1005, 1009, 1011, 1013 and 1015) represent the second level scheduling.

Figure 10A:
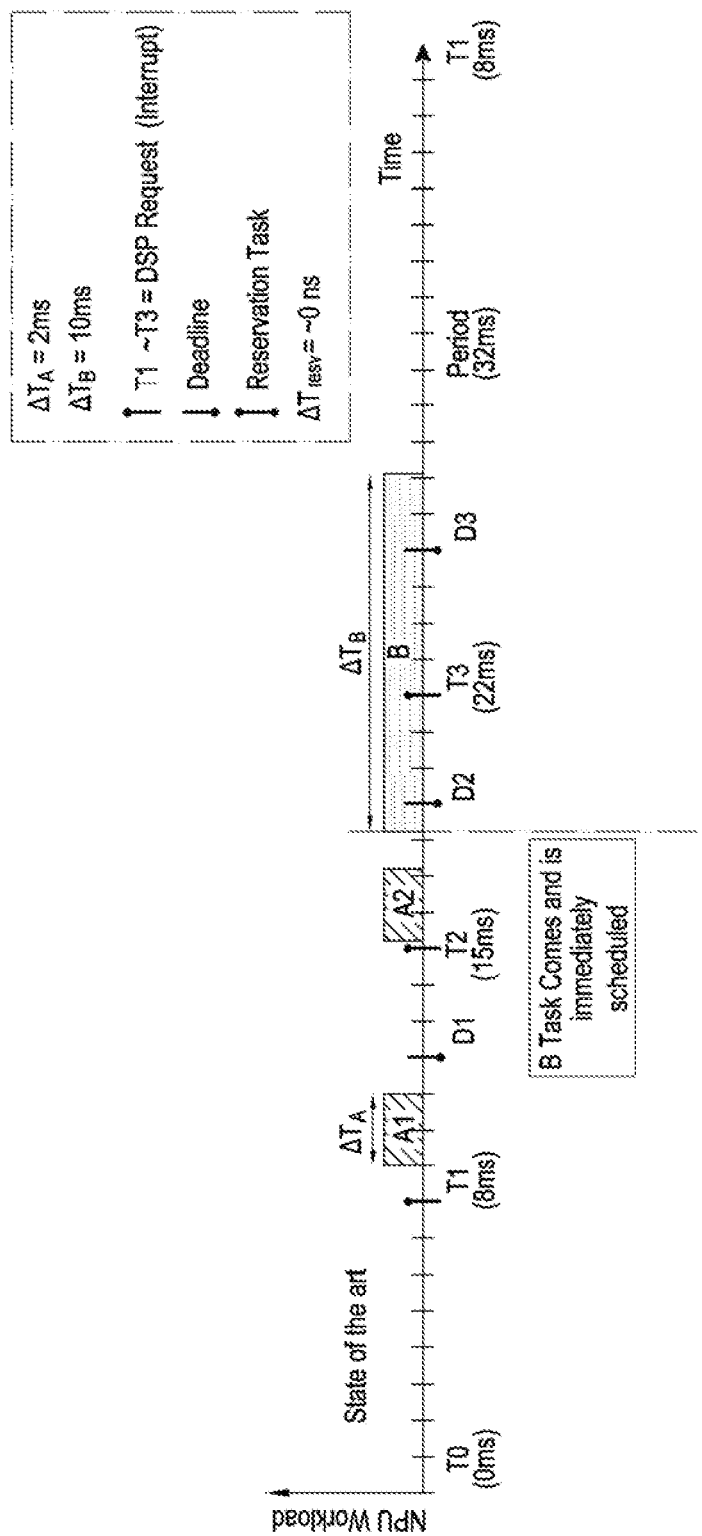
FIGS. 10A and 10B illustrate another working scenario after FIG. 8, in accordance with an embodiment of the present disclosure.

FIG. 10A-14B show various example diagrams based on the RBS scheduler 1605, according to an embodiment of the present disclosure. FIGS. 10A and 10B illustrate an example scenario between T=T2 and T=T3 when the task B arrives.

Figure 10B:
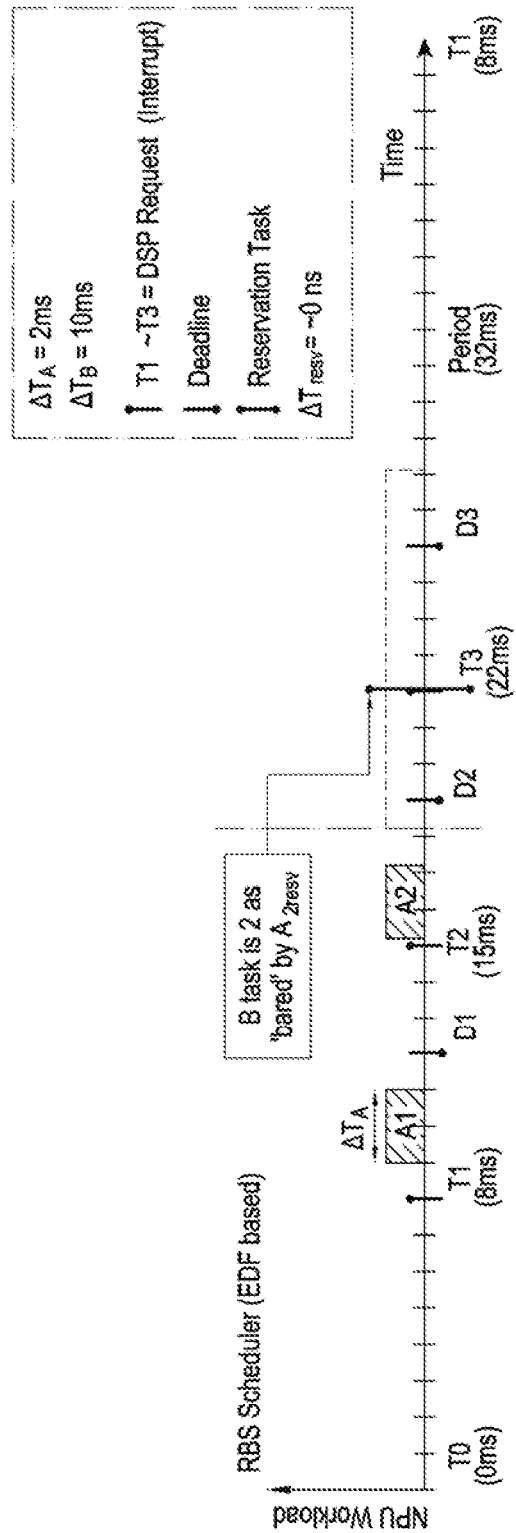

As shown in FIG. 10A (depicting the relevant art), the B Task is immediately scheduled upon arrival. However, in accordance with an embodiment of the present disclosure as depicted in FIG. 10B, the task B is 'barred' by $A2_{resv}$, and accordingly, not scheduled immediately. As discussed later, the task B is scheduled after a delay to allow the occurrence of the task A2 first.

Figure 11A:
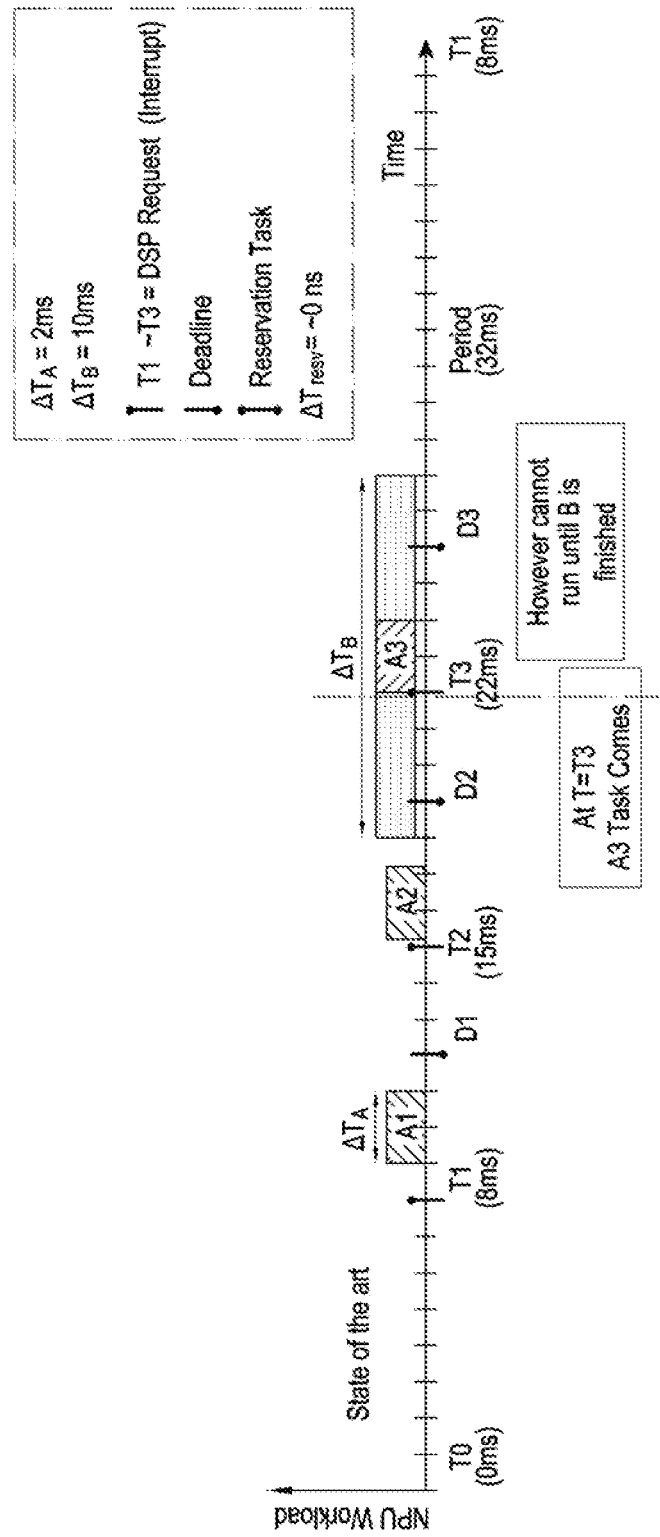
FIGS. 11A and 11B illustrate another working scenario after FIGS. 10A and 10B, in accordance with an embodiment of the present disclosure.
Figure 11B:
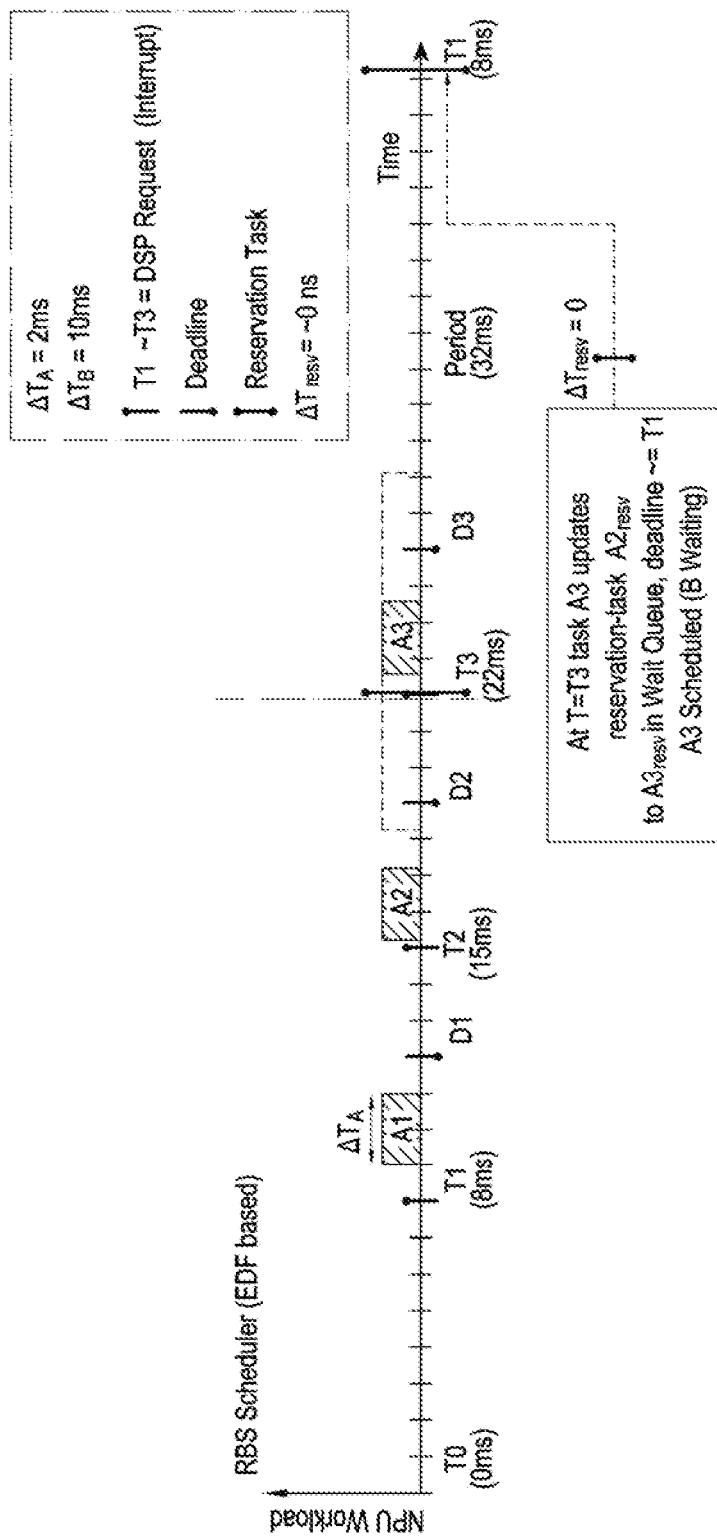

FIGS. 11A and 11B illustrate an example scenario at T=T3, when A3 task arrives. In FIG. 11A (depicting the relevant art), the task A3 cannot run until B is finished. However, in accordance with an embodiment of the present disclosure as depicted in FIG. 11B, at T=T3, the task A3 updates a reservation-task $A2_{resv}$ to $A3_{resv}$ in Wait Queue, and the reservation task deadline is extended till the occurrence of T1 as a next cycle.

Figure 12A:
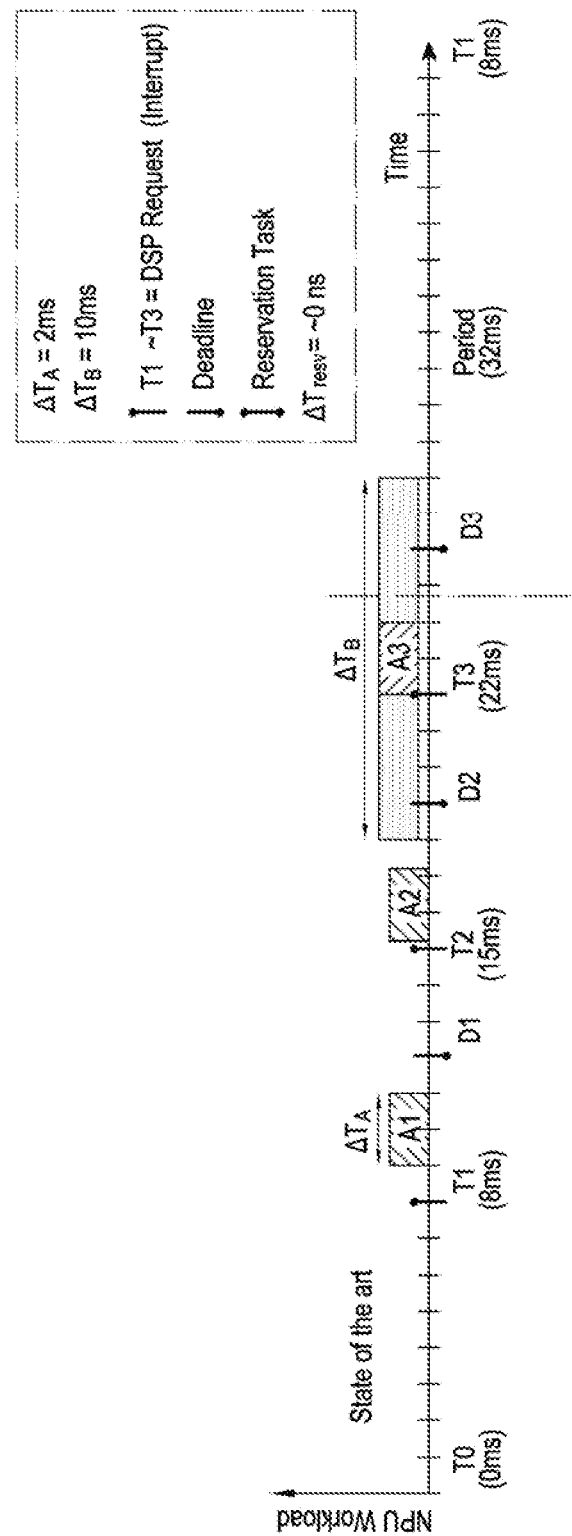
FIGS. 12A and 12B illustrate another working scenario after FIGS. 11A and 11B, in accordance with an embodiment of the present disclosure.
Figure 12B:
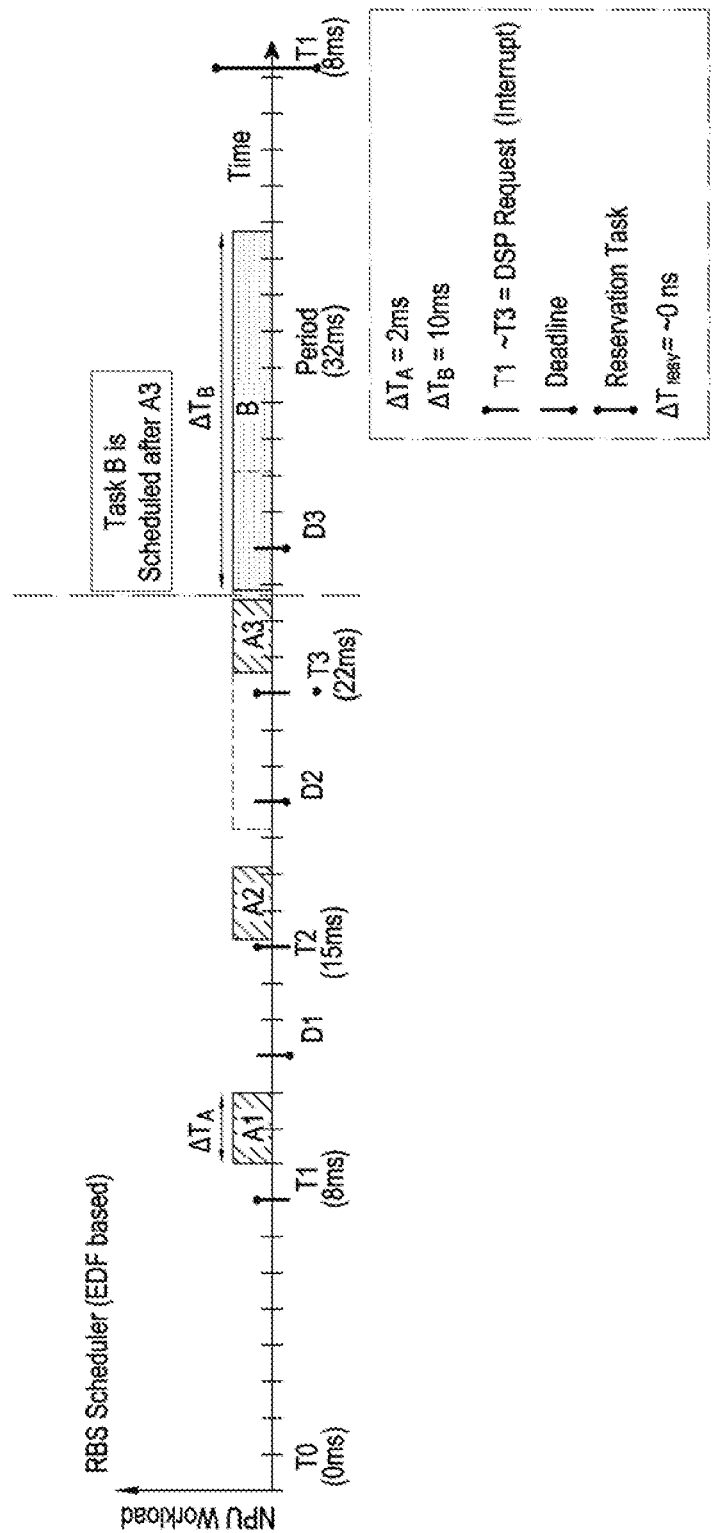

FIGS. 12A and 12B illustrate another example scenario. In FIG. 12A (depicting the relevant art), the task A3 cannot run until B is finished. However, in accordance with an embodiment of the present disclosure as depicted in FIG. 12B, the task B is scheduled after A3.

Figure 13A:
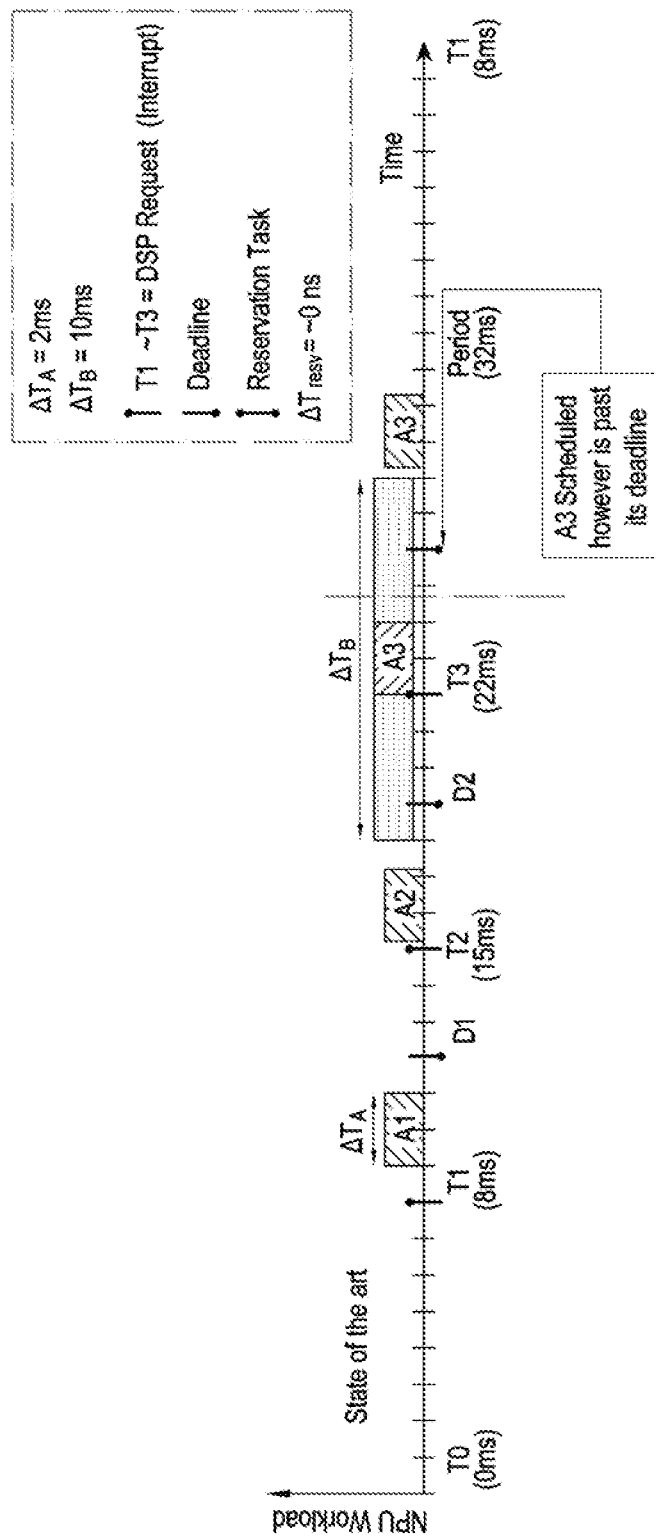
FIGS. 13A and 13B illustrate another working scenario after FIGS. 12A and 12B, in accordance with an embodiment of the present disclosure.
Figure 13B:
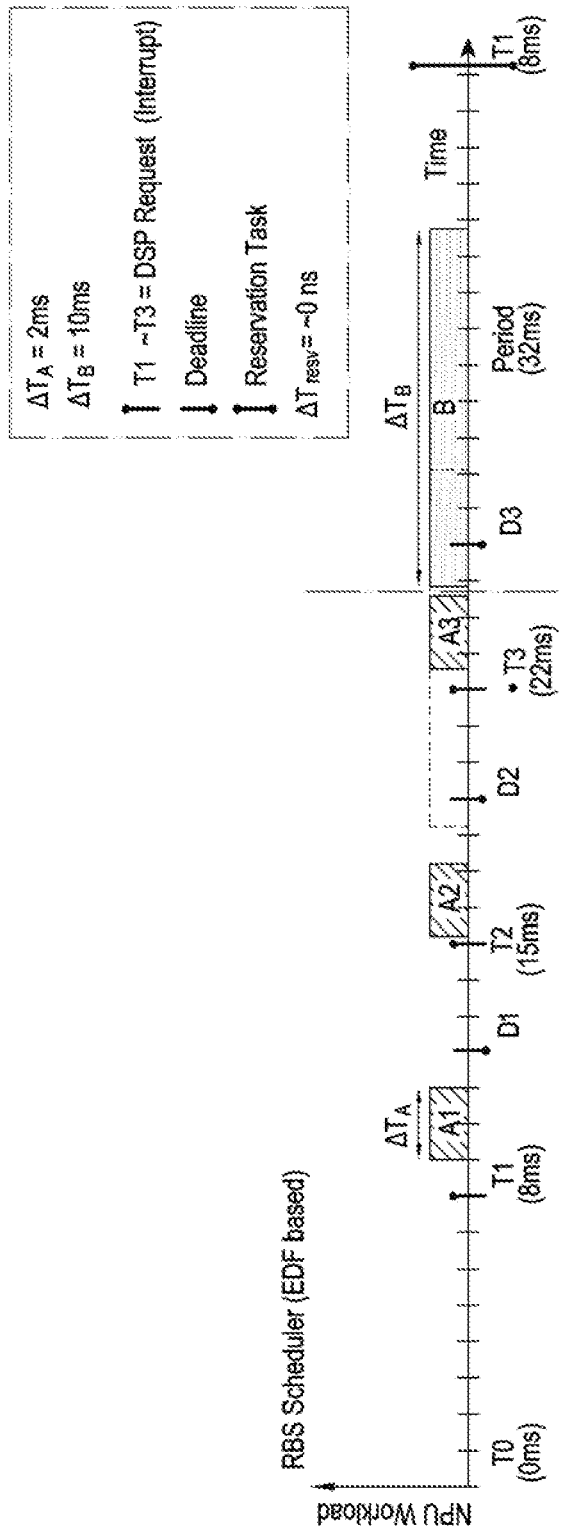

FIGS. 13A and 13B illustrate another example scenario. In FIG. 13A (depicting the relevant art), the task B is completed and A3 is now scheduled. However, A3 is already past its deadline. However, in accordance with an embodiment of the present disclosure as depicted in FIG. 13B, the task B is scheduled after A3. Accordingly, both the tasks A3 and B are scheduled in accordance with the deadline.

Figure 14A:
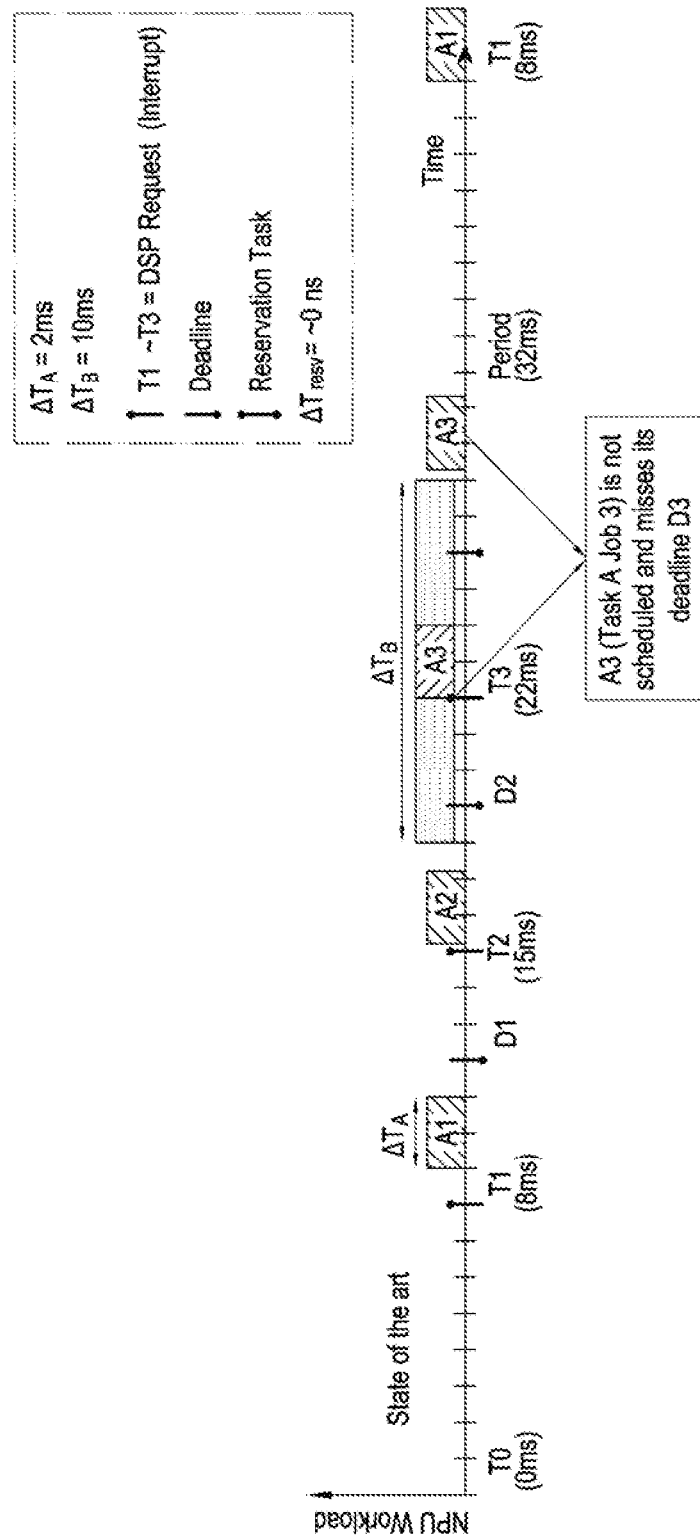
FIGS. 14A and 14B illustrate another working scenario after FIGS. 13A and 13B, in accordance with an embodiment of the present disclosure.
Figure 14B:
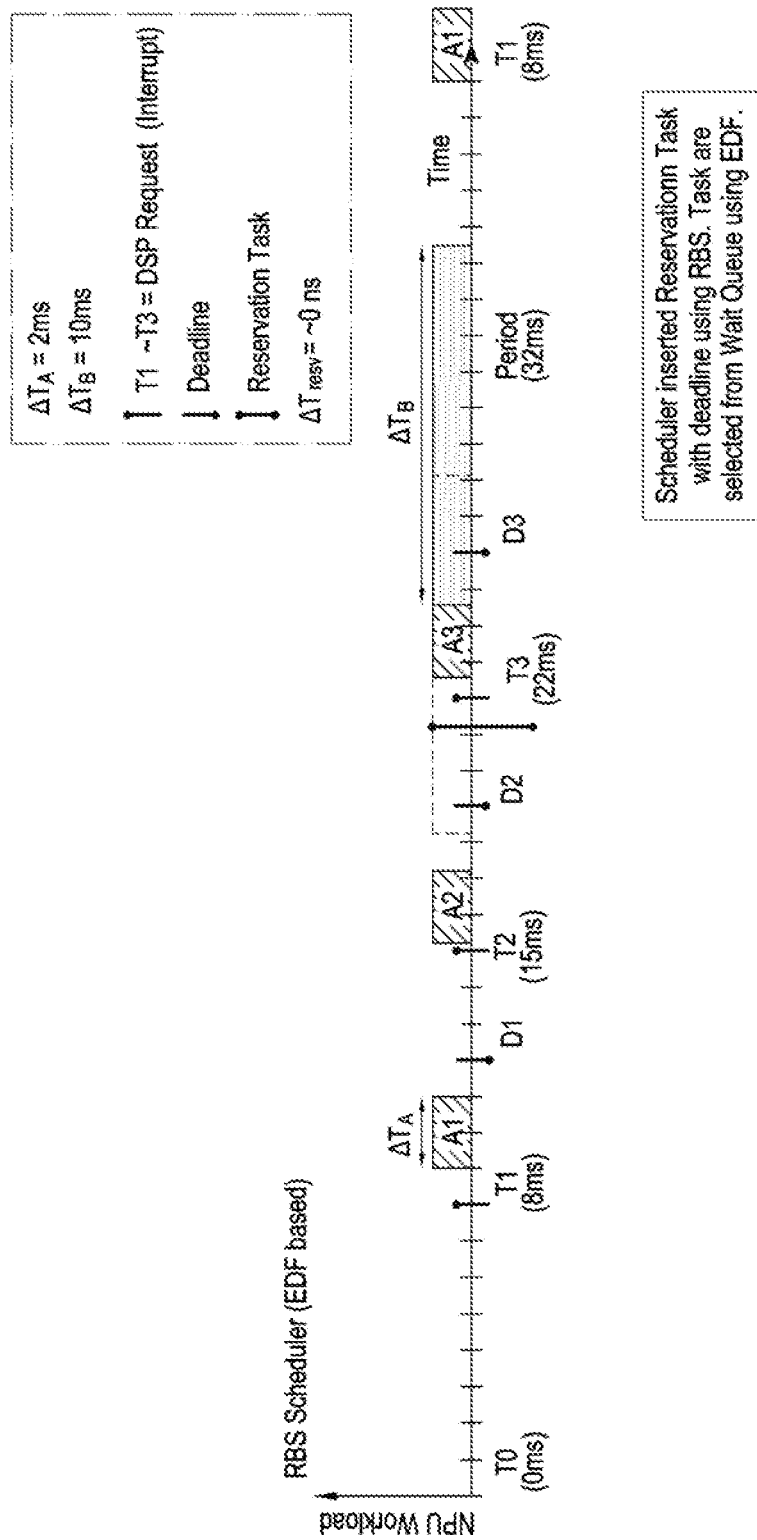

FIGS. 14A and 14B refer another example scenario. In FIG. 14A depicting the state of the art, any RT with long enough run time can cause deadline misses for other RT task. A3 (Task A, Job 3) is not scheduled and misses its deadline D3. However, in accordance with the embodiment of the present disclosure as depicted in FIG. 14B, the scheduler 1605 inserts the Reservation Task with deadline using RBS. The task is selected from Wait Queue using EDF. Accordingly, both A3 and B are scheduled in accordance with the deadline.

Figure 15:
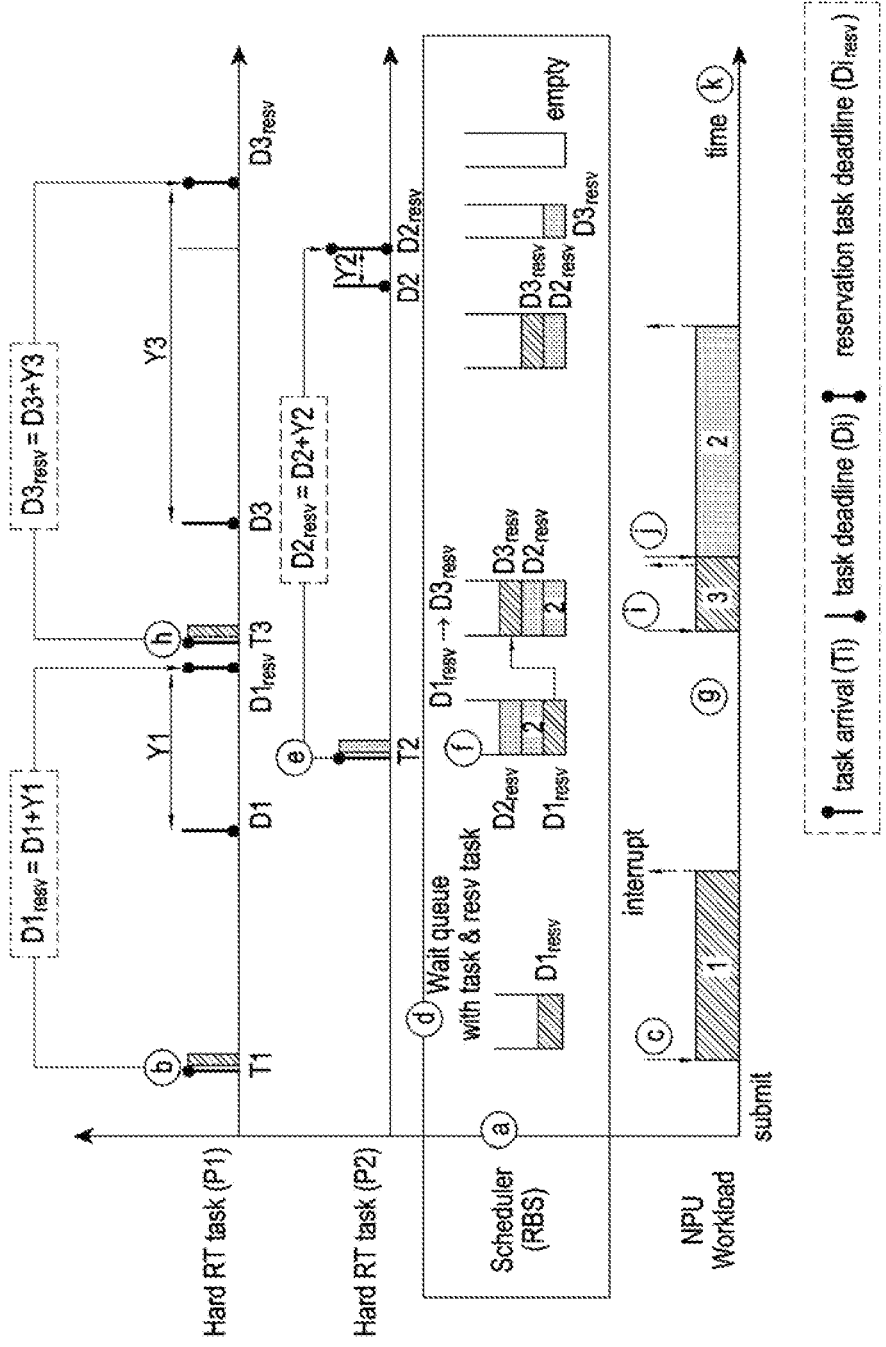
FIG. 15 illustrates example operation, in accordance with an embodiment of the present disclosure.

FIG. 15 shows an example diagram of an event sequence according to an embodiment of the present disclosure. In the example diagram, an arrival of the task T1, T2 and T3 may be considered in the order of T1, T2 and T3. The operation in accordance with the present figure may be referred to as a sequence of operations (a) to (f).

Initially at operation (a), Scheduler 1605 is Idle.

Then, at operation (b), the task1, i.e., T1 (Deadline: D1) Enqueued [RT-WQ has D1 & D1resv (=D1+Y1].

Thereafter, at operation (c), D1 (task T1) is scheduled by EDF i.e. $D1 < D1_{resv} < D3 < D2 < D2_{resv} < D3_{resv}$.

At operation (d), the RT-WQ is left with a reservation task (from task T1) with deadline $D1_{resv}$.

At operation (e), task T2 (Deadline: D2) Enqueued.

At operation (f), D2 & D2resv (D2+Y2) are enqueued to RT-WQ. [RT-WQ has $D1_{resv}$, D2, and $D2_{resv}$].

At operation (g), since $D1_{resv}$ is least, EDF return $D1_{resv}$ and the scheduler kept.

At operation (h), task T3 (Deadline:D3) is enqueued. D3 & $D3_{resv}$ are enqueued to RT-WQ [$D1_{resv}$ updated to $D3_{resv}$ (D3+Y3)].

At operation (i), D3 (task T3) is enqueued by EDF.

Thus, at operation (j), task T2 is enqueued.

Overall, the execution order of the task is T1 then T3, and then T2, respectively. Accordingly, the RBS mechanism provided with the reservation tasks ensures maintaining a priori guarantee for multiple RT tasks in a non-preemptive system. The RBS handles a dynamic arrival of tasks and outperforms the relevant art's budget-based bandwidth reservation scheme that fails for non-preemptive systems.

On the other hand, the RBS of the present disclosure uses the yield time, and associates a reservation task width deadline $D_{resv}$. $D_{resv}$ ensures that no task with a deadline later than itself is scheduled. Hence, the RBS reserves a bandwidth for the task $A_{j+1}$ as illustrated in FIGS. 4 and 5. Moreover, through applying the priority inversion as depicted in FIG. 5, the scheduler (RBS) achieves the maximum utilization without compromising a scheduling ability.

FIG. 16 shows an architecture for the computing system according to an embodiment of the present disclosure. The computing system 1600 may include a H/W Layer 1607, a driver 1609, a NN runtime 1603, an application layer 1611. In an embodiment, the H/W layer 1607 includes a NPU Hardware 1613 and an Image Quality H/W-Audio DSP 1615. The NPU Hardware 1613 is a non-preemptive compute processor for AI/Machine Learning (ML) workload and the Image Quality H/W-DSP 1615 are for a multimedia pipeline.

Further, the driver 1609 may include a NPU driver 1601, a RBS Scheduler (a scheduler) 1605 and media drivers 1617. In an embodiment, various software stacks to use the hardware. This layer schedules the task request. The RBS Scheduler (or the scheduler) 1605 is added to control the scheduling logic to support RT clients. The scheduler 1605 is configured to perform the method explained in FIGS. 2 and 3 above.

Further, the NN Runtime 1603 is configured for middleware framework that exposes platform-specific NN API and connects with the driver 1609. Further, the application layer 1611 includes a set of RT/Non Real-Time (NRT) clients, which wants to use the NPU functionality to process their workloads.

FIG. 17 shows various components of the RBS Scheduler (or the scheduler) 1605, according to an embodiment of the present disclosure. The RBS scheduler 1605 may include an interface 1701, a reservation bandwidth server (RBS) 1703, a task scheduler 1705, a task profiler 1707. In an embodiment, the interface 1701 is a kernel interface with the NPU driver 1601 to support request scheduling via a RT Scheduler. As explained above the RBS 1703 creates the reservation task with a deadline calculated from task attributes in accordance with the operations 201 to 207.

Further, the reservation tasks are used for RT Tasks in RT Work Queue. The task scheduler 1705 provides a first-level scheduling and a second-level scheduling as explained in FIG. 9 and incorporates the priority inversion mechanism as depicted in operation 209 of FIG. 2. The task profiler 1707 profiles an actual processing time (finish-start) and provides a feedback to the RBS Scheduler (or the scheduler) 1605.

Figure 18A:
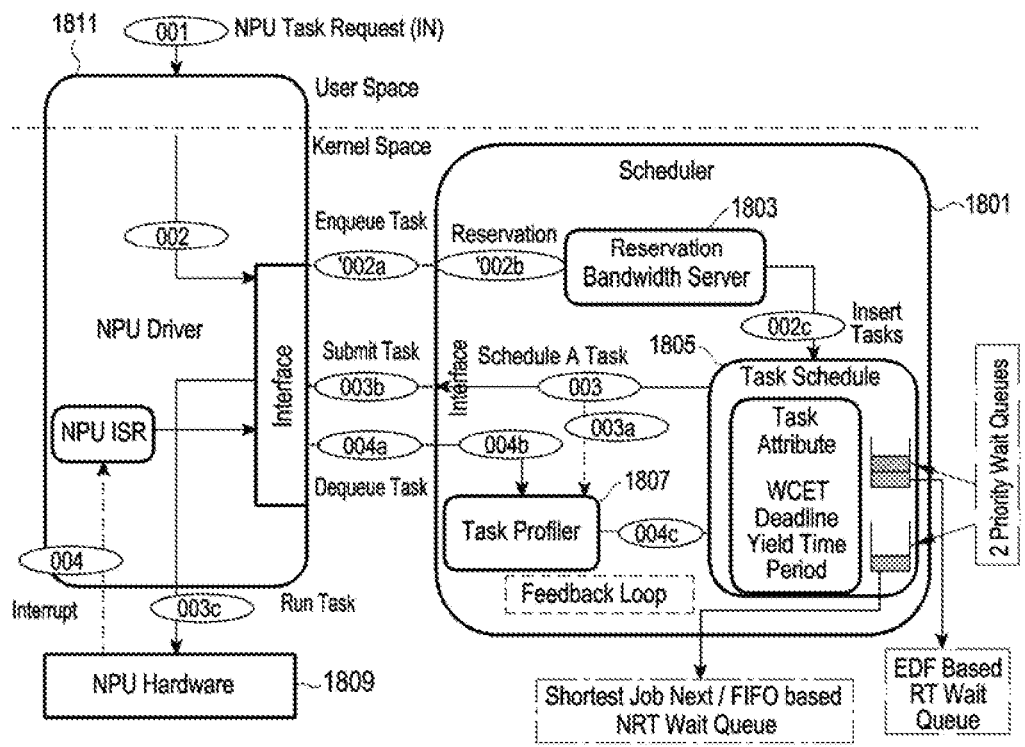
FIGS. 18A and 18B illustrate yet another embodiment of the method-operations of FIG. 2, in accordance with an embodiment of the present disclosure.
Figure 18B:
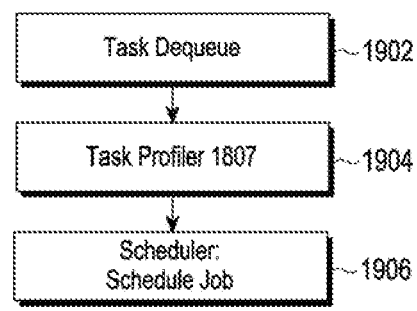

FIGS. 18A and 18B show a detailed embodiment of the computing system and a task-dequeue process, in accordance with the present disclosure. FIG. 18A illustrates a detailed design depicting a control flow underling the embodiments of FIGS. 16 and 17. In an embodiment, the scheduler 1801 is an event-driven based on an enqueue event such as NPU task request as shown in operation 001 or dequeue an ISR event received from the NPU hardware interrupt.

As a further example, at operation 001, the NPU Task Request is inputted with Attributes (yield time) from NN Runtime.

Thereafter, at operation 002, the NPU driver 1811 processes the request as follows. At Operation 002*a*, the NPU driver 1811 uses a Scheduler Interface to enqueue the task request. At operation 002*b*, if the Task is RT, the RBS uses the yield time from the task attribute to create a reservation task with a deadline (D+Y). Such reservation tasks are non-executable and only provide reservation for upcoming task.

The yield time (Y) provides how much bandwidth is to be made available for other application tasks. At any instance of time, only one reservation task is present for 'a RT task'. If a task has already a reservation task from earlier request, its deadline is updated with a new deadline to reflect a new bandwidth reservation. At operation 002*c*, the scheduler inserts both the task and the reservation task with respective deadlines to corresponding (RT/NRT) work queues.

The operations 001 and 002 correspond to the operations 201 to 207 of FIG. 2 and thereby, creating RT/NRT work queues for enabling the RBS Scheduler 1801 to call a "Schedule Job."

Thereafter, at operation 003, if the scheduler 1801 is idle, then the scheduler 1801 uses EDF to pick a next schedulable task. If reservation task which cannot be executed has earliest deadline, then the Scheduler 1801 applies Priority Inversion to find other schedulable task, else the chosen task is selected to be scheduled and submitted to driver to run.

The scheduler's state changes to 'Busy' state if the task is selected. If no task is selected, the next enqueue event is awaited. Thereafter, at operation 003*a*, the NPU Profiler starts a counting from the current time. Then, at operation 003*b*, the scheduler 1801 submits the task to the NPU driver 1811 to run it. Thereafter, at operation 003*c*, the NPU driver 1811 submits the task to the NPU hardware 1809 to execute/run the job.

The operation 003 corresponds to operation 209 of FIG. 2. At operation 004, upon the task completion, the NPU hardware 1809 triggers an interrupt and the NPU ISR is invoked by the event. More specifically, the at least submitted RT and/or NRT task is processed by the NPU driver 1811 through a processor hardware unit 1809. Upon receiving a task-completion based interrupt from the processor hardware unit 1809, the interrupt handler or the NPU ISR forming a part of the NPU driver 1811 is invoked.

At operation 004*a*, the NPU driver 1811 calls a dequeue task to update a status to the scheduler 1801, based on the invocation of the interrupt handler or the NPU ISR. The dequeue trigger signals a completed execution of the submitted task and triggers the (event based task) scheduler 1801 for selecting a next task for submission. The next task may be one or more of the bandwidth reservation task in the RT wait queue; an unscheduled RT task; an unscheduled NRT task; the next RT task in the RT wait queue; and the next NRT task in the NRT wait queue or NIL task.

In an embodiment, as a part of operation 004*a*, the 'Task Dequeue' interface is called by the NPU driver 1811 upon receiving the interrupt to signal the completed execution of the submitted task.

At operation 004*b*, the state of the scheduler 1801 is set to Idle. A task profiler 1807 finishes the counting and profiles a time of (Dequeue—Scheduled), i.e. an actual processing time. The task profiler 1807 determines an actual completion time of each completed task. The completion time corresponds to a difference between a scheduled time of the completed task and a finish time of the completed task. The task profiler 1807 logs the completion time of each completed task.

As the scheduler 1801 is an event driven, i.e. the NPU ISR handler relays the completion notification by calling the 'Task Dequeue' Interface. The task profiler 1807 determines the 'actual' completion time of each task, dynamically. The task profiler 1807 keeps the historical data for the 'completion' time for last few N (Recent) tasks. This dynamic data can be fed to the scheduler 1801 to optimize and enhance the task attributes to make runtime decision better. Or the dynamic data can be used by the system to tune the parameters.

If there are pending requests in RT/NRT Work-Queue, the scheduler 1801 (Schedule Job) is again invoked. So, the 'Task Dequeue' and the 'Task Enqueue' are the two Interfaces used to schedule the task by the Scheduler 1801. At operation 004*c*, the Task Profiler 1807 sends updated task parameters (like WCET) and optimizes the task scheduler 1805.

FIG. 18B illustrates an operation interaction based on the operations 004*a* to 004*c* of FIG. 18A, and thereby, depicts the operation of the task scheduler 1801. Operation 1902 corresponds to operation 004*a* where the 'Task Dequeue' interface is called by the NPU driver 1811 upon receiving an interrupt to signal the complete execution of the submitted task. As the scheduler 1801 is an event driven, i.e. the NPU ISR handler relays the completion notification by calling the 'Task Dequeue' Interface.

Operation 1904 corresponds to operation 004*b* where the task-profiler 1807 in the scheduler 1801 determines the 'actual' completion time of each task, dynamically. The task-profiler 1807 keeps the historical data for the 'completion' time for last few N (Recent) tasks. This dynamic data can be fed to the scheduler 1801 to optimize and enhance the task attributes to make runtime decision better or to enable tuning of the parameters.

Operation 1906 corresponds to operation 004*b* and 004*c*. If there are pending requests in the RT/NRT Work-Queue, the "Schedule Job" is again invoked. Overall, the 'Task Dequeue' and the 'Task Enqueue' are the two interfaces used to schedule the task by the RBS scheduler 1803.

Figure 19:
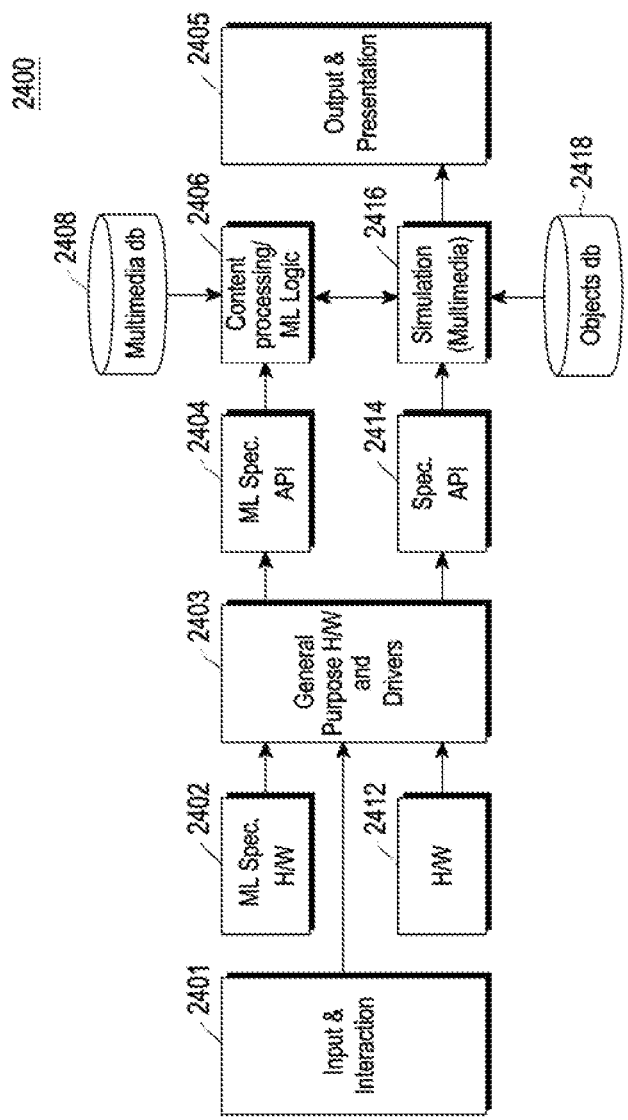
FIG. 19 illustrates another system architecture, in accordance with an embodiment of the present disclosure.

FIG. 19 illustrates a representative architecture 2400 to provide tools and development environment described herein for a technical-realization of the server, the controller and the nodes in a mesh network through a computing device. FIG. 19 is a non-limiting example, and many other architectures may be implemented to facilitate the functionality described herein. The architecture may be executing on hardware such as a computing machine 2400 of FIG. 19 that includes, among other things, processors, memory, and various application-specific hardware components.

The architecture 2400 may include an operating system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer may include system libraries such as file-system (e.g., C standard library) that may provide functions such as memory allocation functions, string manipulation functions, mathematic functions, and the like. In addition, the hardware interface layer may include API libraries such as audio-visual media libraries (e.g., multimedia data libraries to support presentation and manipulation of various media format such as MPEG4, H.264, MP3, AAC, AMR, JPG, PNG), database libraries (e.g., SQLite that may provide various relational database functions), web libraries (e.g. WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of Application-Specific Integrated Circuit (ASIC) chip, Field-Programmable Gate Arrays (FPGAs), and a programmable-logic device, which have been known or are to be developed.

Further, the architecture 2400 depicts an aggregation of audio/video processing device based mechanisms and ML/NLP based mechanism in accordance with an embodiment of the present disclosure. A user-interface defined as input and interaction 2401 refers to overall input. It can include one or more of the following—touch screen, microphone, camera etc. A first hardware module 2402 depicts specialized hardware for ML/NLP based mechanisms. In an example, the first hardware module 2402 comprises one or more of neural processors, FPGA, DSP, GPU etc.

A second hardware module 2412 depicts specialized hardware for executing the data splitting and transfer. ML/NLP based frameworks and APIs 2404 correspond to the hardware interface layer for executing the ML/NLP logic 2406 based on the underlying hardware. In an example, the frameworks may be one or more or the following—Tensorflow, Cafe, NLTK, GenSim, ARM Compute etc. Simulation frameworks and APIs 2414 may include one or more of— Audio Core, Audio Kit, Unity, Unreal etc.

A database 2408 depicts a pre-trained database. The database 2408 may be remotely accessible through cloud by the ML/NLP logic 2406. In other example, the database 2408 may partly reside on cloud and partly on-device based on usage statistics. Another database 2418 refers the memory. The database 2418 may be remotely accessible through cloud. In other example, the database 2418 may partly reside on the cloud and partly on-device based on usage statistics.

A rendering module 2405 is provided for rendering audio output and trigger further utility operations. The rendering module 2405 may be manifested as a display cum touch screen, monitor, speaker, projection screen, etc. A general-purpose hardware and driver module 2403 corresponds to the computing device 2500 In FIG. 20 and instantiates drivers for the general purpose hardware units as well as the application-specific units 2402, 2412.

In an example, the ML mechanism underlying the present architecture 2400 may be remotely accessible and cloud-based, thereby being remotely accessible through a network connection. An audio/video processing device may be configured for remotely accessing the NLP/ML modules and simulation modules may comprise skeleton elements such as a microphone, a camera a screen/monitor, a speaker etc.

Further, at least one of the plurality of modules of mesh network may be implemented through AI based on an ML/NLP logic 2406. A function associated with AI may be performed through the non-volatile memory, the volatile memory, and the processor constituting the first hardware module 2402 i.e. specialized hardware for ML/NLP based mechanisms. The processor may include one or a plurality of processors. At this time, one or a plurality of processors may be a general purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU). Those processors collectively correspond to the processor 2502 of FIG. 20.

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of the desired characteristic is made. "Obtained by training" means that a predefined operation rule or artificial intelligence model configured to perform a desired feature (or purpose) is obtained by training a basic artificial intelligence model with multiple pieces of training data by a training technique. The learning may be performed in a device (i.e., the architecture 2400 or the device 2500) itself in which AI according to an embodiment is performed, and/or may be implemented through a separate server/system.

The AI model may include a plurality of neural network layers. Each layer has a plurality of weight values, and performs a neural network layer operation through calculation between a result of computation of a previous-layer and an operation of a plurality of weights. Examples of neural-networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The ML/NLP logic 2406 is used for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Figure 20:
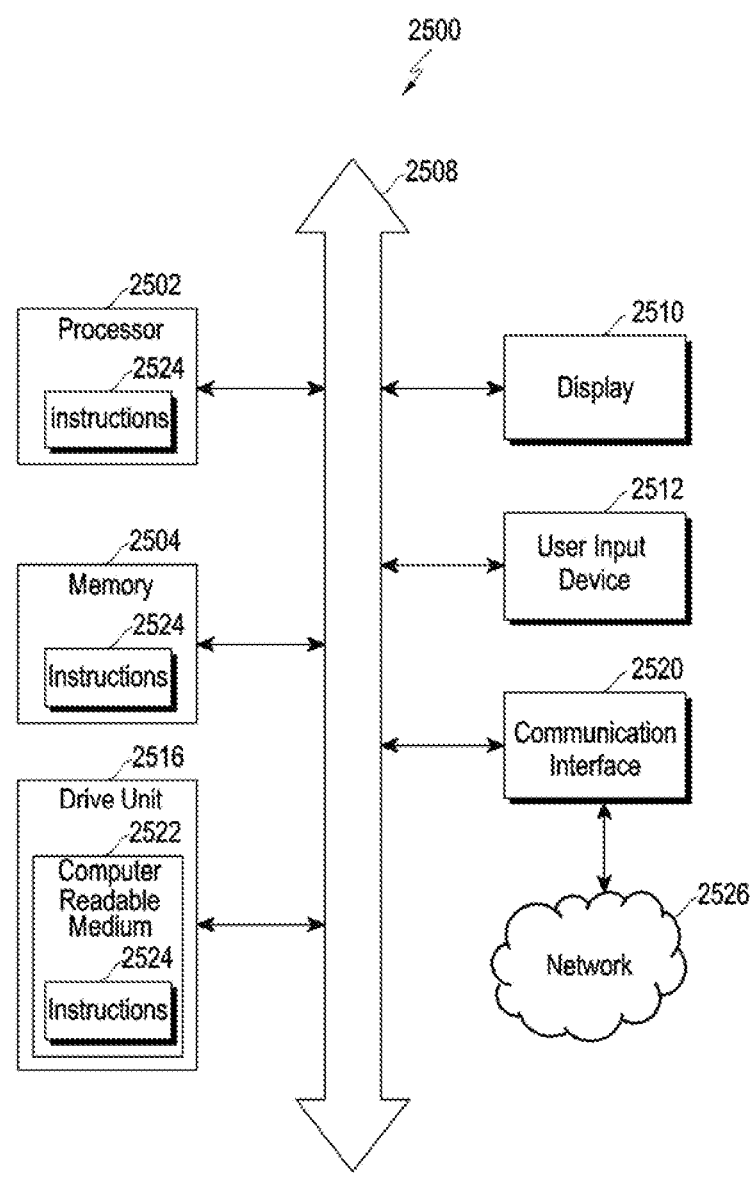
FIG. 20 illustrates yet another exemplary embodiment in accordance with an embodiment of the present disclosure.

FIG. 20 shows yet another exemplary embodiment in accordance with the present disclosure, and yet another typical hardware configuration of the system 2400 in the form of a computer system 2500. The computer system 2500 can include a set of instructions that can be executed to cause the computer system 2500 to perform any one or more of the methods disclosed. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 can also be implemented as or incorporated across various devices, such as a Personal Computer (PC), a tablet PC, a Personal Digital Assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" shall also be taken to include any collection of systems or sub-systems that individually or jointly execute a set, or multiple sets, of instructions to perform one or more computer functions.

The computer system 2500 may include a processor 2502 e.g., a CPU, a GPU, or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (i.e., programmed).

The computer system 2500 may include a memory 2504, such as a memory 2504 that can communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random access memory for the processor 2502. In alternative examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or the drive unit 2516.

Additionally, the computer system 2500 may include an input device 2512 configured to allow a user to interact with any of the components of system 2500. The computer system 2500 may also include a disk or optical drive unit 2516. The disk drive unit 2516 may include a computer-readable medium 2522 in which one or more sets of instructions 2524, e.g. software, can be embedded. Further, the instructions 2524 may embody one or more of the methods or logic as described. In a particular example, the instructions 2524 may reside completely, or at least partially, within the memory 2504 or within the processor 2502 during execution by the computer system 2500.

The present disclosure contemplates a computer-readable medium that includes instructions 2524 or receives and executes instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or maybe a separate component. The communication port 2520 may be created in software or maybe a physical connection in hardware. The communication port 2520 may be configured to connect with a network 2526, external media, the display 2510, or any other components in system 2500, or combinations thereof. The connection with the network 2526 may be a physical connection, such as a wired Ethernet connection or may be established wirelessly as discussed later. Likewise, the additional connections with other components of the system 2500 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

AI Sound being a RT application requires stringent deadline guarantee. The inference is performed at intervals of about 8 ms due to AI sound constraints (using NPU), failing which the audio lags/skips thereby jeopardizing the operation of system. The RBS scheduler uses the parameters and ensures a-priori guarantee so that all jobs are successfully completed in time. RBS can schedule other tasks in yield time while maintaining a guarantee.

Figure 21:
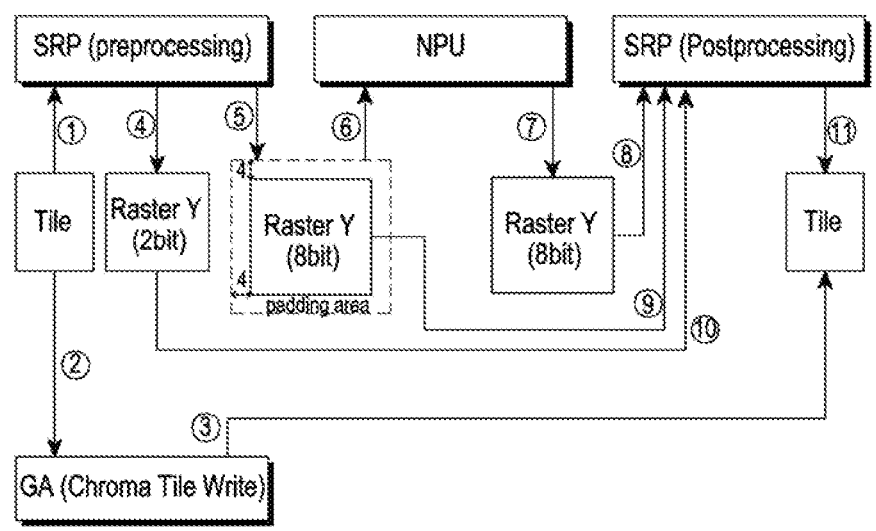
FIGS. 21, 22A, 22B, 23, 24A, 24B, 24C, 25A, 25B and 25C illustrate various exemplary uses cases based on the present mechanism, in accordance with an embodiment of the present disclosure.
Figure 21:
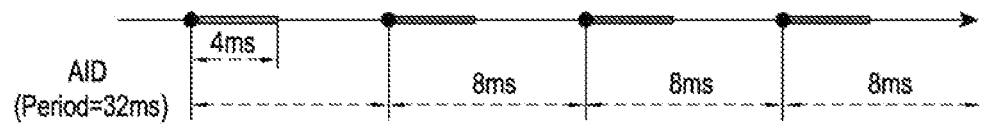

FIG. 21 illustrates an example application in the form of AI decoder and decoder in accordance with the present subject matter. AI Decoder in accordance with the present subject matter provides AI-based 4K streaming solutions to overcome network bandwidth limitations. The same corresponds to standard codec Interworking Deep Learning Based Image before/after Processing Compression Technology. In another example, AI Decoder renders 2K to 4K Upscaling at Device such as TV using NPU.

Up-Scaling Pipeline consists of multiple H/W components for processing (pipeline defined by Video-Decoder, Pre-Processing, NPU, Post-Processing and Display) is executed for 1 frame output/display. In operation, for example, 30 fps, all components need to complete their execution within strict timing constraints. The image is divided into multiple tiles and needs to complete for example in 32 ms based on 30 fps. The scheduler needs to ensure that NPU completes job at precise-deadlines. Any other task is not expected to cause a missed-deadline leading to wrong/delayed video frame. The RBS in accordance with the present subject matter is able to schedule AID along-with other mixed tasks improving the NPU utilization.

Figure 22A:
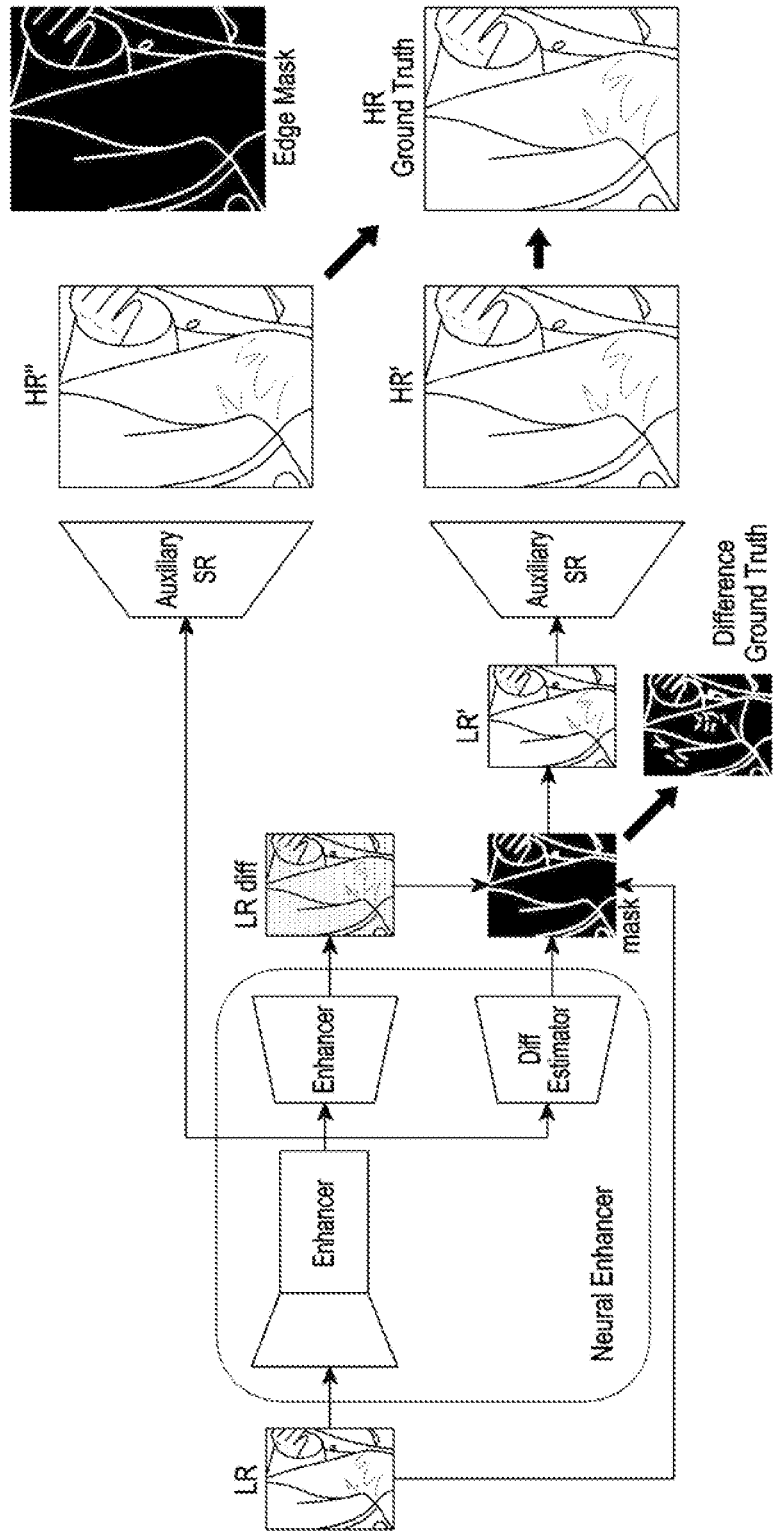
Figure 22B:
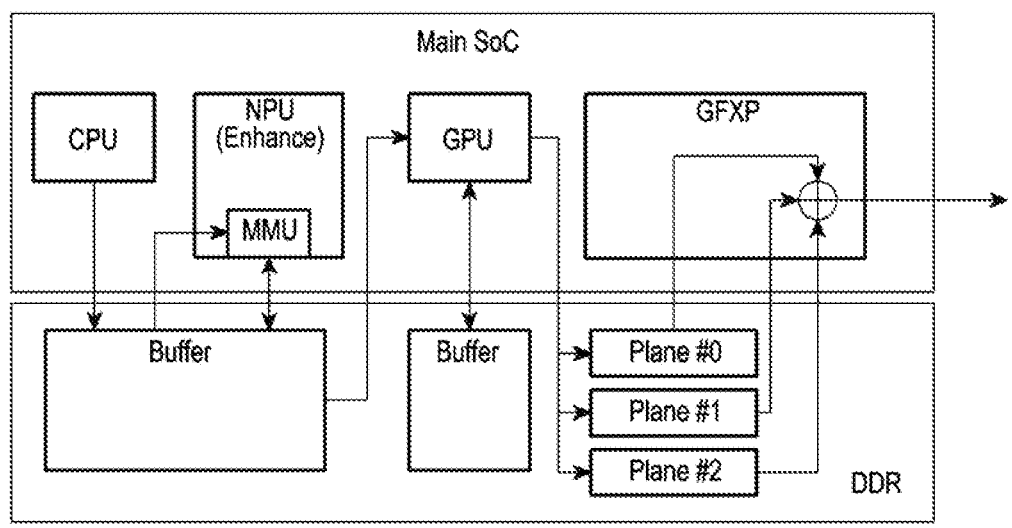

FIGS. 22A and 22B illustrate an example application in the form of AI Enhancer (AIE) for an image in accordance with the present subject matter. FIG. 22A illustrates an AI Enhancer (AIE) application acting as an NRT application. As a part of Single Image Super-Resolution (SISR), an image may exhibit low display quality compared to TV resolution (4K/8K) (2K/4K). Accordingly, there is always a need to process images before considering H/W scaler and image quality engine. As a part of the implementation of NPU on-device single image super-resolution, simultaneous operation with AIS is implemented by applying 250×250 size Tile 4 times for various size Thumbnail images. While NRT application doesn't have strict deadline, however the same may be scheduled with RT running tasks in accordance with the present subject matter.

FIG. 22B represents a representation of mixed task scheduling comprising the scheduling of the RT app (e.g. AIS) along-with the NRT app (AIE) as depicted in FIG. 22A. In respect of AI-enabled enhancement of sound, it may be imperative to have scheduling logic in which can increase utilization of NPU, by giving other clients (i.e., tasks) fair change to prevent starvation. The RBS Scheduler in accordance with the present subject matter performs optimal-scheduling in such mixed tasks scheduling through appropriating the architecture as depicted in FIG. 22b.

Figure 23:
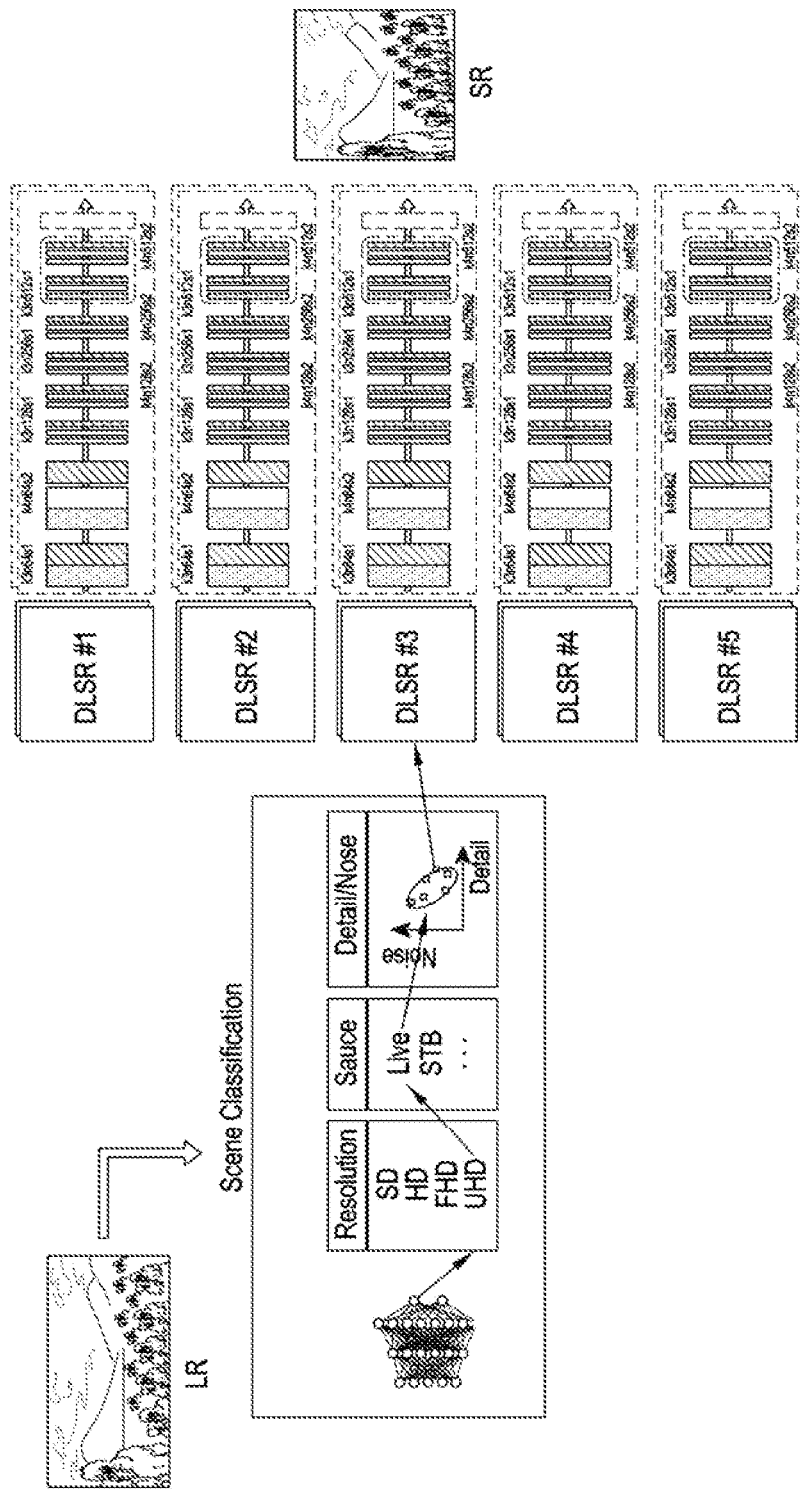

FIG. 23 illustrates a scene classification through RT application in accordance with the present subject matter and thereby achieves an improvement of a DSLR image quality performance through the development of image quality classification network. More specifically, flexible DSLR Image Engine is applied to Scene Classification Characteristics. Scene classification by resolution/source/image quality through AI based scene classification By applying scene classification, a RT application is schedulable with other AI applications with strict deadlines. For scene classification and other tasks, the RBS scheduler provides an optimal solution by providing a dynamic changing scheduling decision.

Figure 24A:
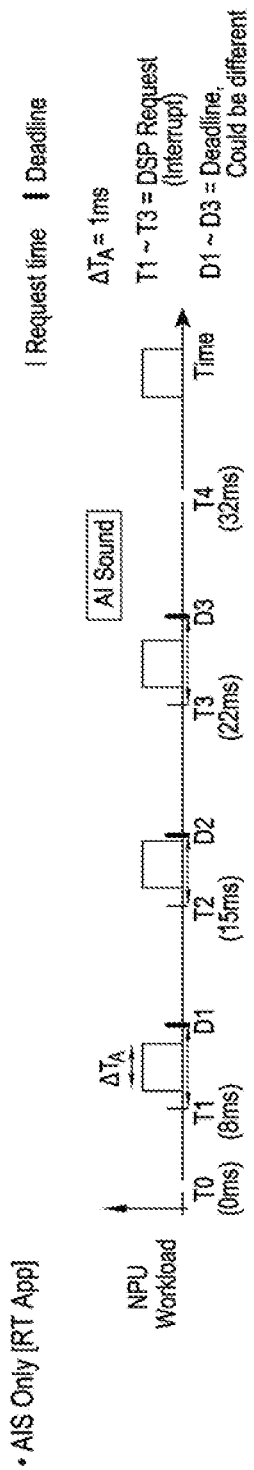
Figure 24B:
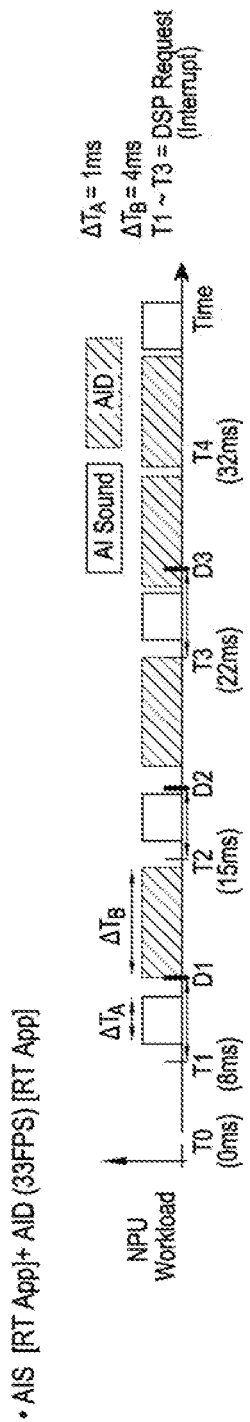
Figure 24C:
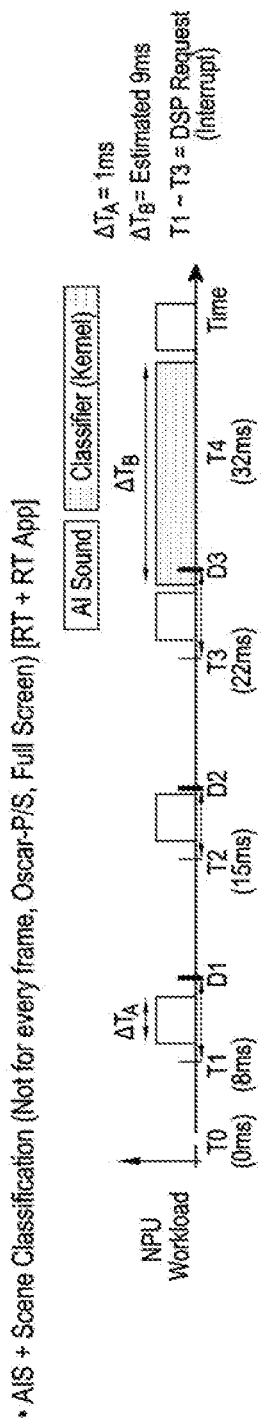

FIGS. 24A, 24B and 24C illustrate an example environment of mixed-scenarios with a scheduling of RT application and NRT application. Given mixed scenarios with the scheduling of Real-time application and NRT application, a fixed priority scheduling scheme cannot provide the optimal solution. The RBS scheduler can handle dynamically the arrival of tasks and can schedule the tasks in right sequences.

FIG. 24A illustrates a scheduling of the RT task AIS including 3 sub tasks. FIG. 24B illustrates a simultaneous scheduling of two RT applications in the RT-WQ as Task 1 corresponding to AIS and Task 2 corresponds to another RT App corresponding to AID (33 FPS) as discussed in FIG. 21. Accordingly, FIG. 23B illustrates a mixed-scheduling scenario.

FIG. 24C illustrates another mixed scheduling scenario and a simultaneous scheduling of two RT applications in the RT-WQ as Task 1 corresponding to the first RT app AIS and Task 2 corresponding to another RT app corresponding to the Scene Classification.

The yield time and reservation tasks provide the guarantee and are able to schedule all RT/NRT mixed cases efficiently. The RBS provides a way to handle such varying scheduling requirements with reservation tasks reflecting the yield time.

Figure 25A:
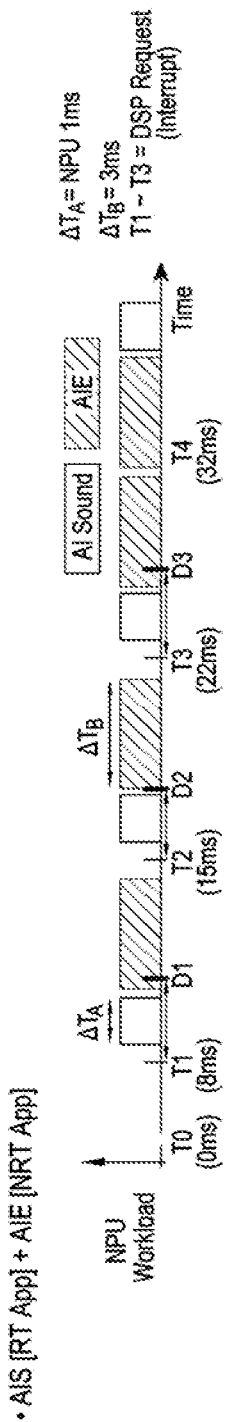
Figure 25B:
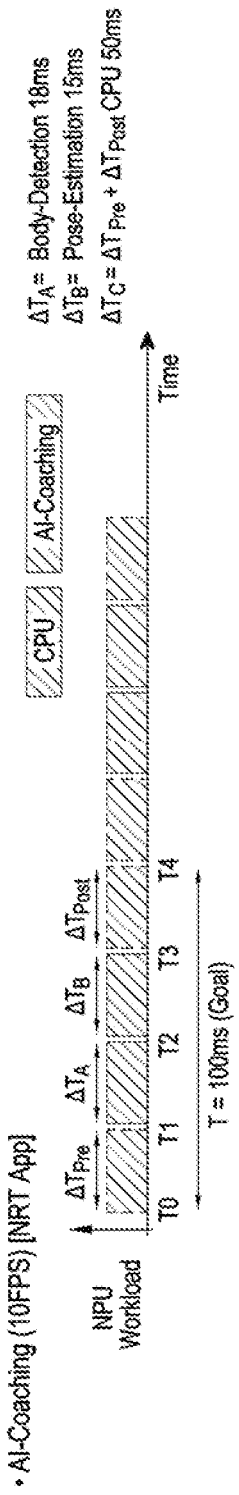
Figure 25C:
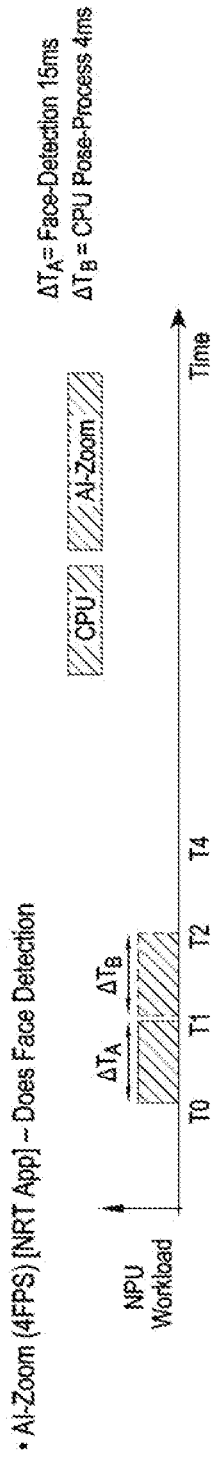

FIGS. 25A, 25B, and 25C illustrate an example environment for a system having only NRT tasks. FIG. 25A illustrates another mixed-scheduling scenario and a simultaneous scheduling of one RT application as AIS and one NRT application as AIE. Accordingly, for RT tasks, the RBS scheduler 1801 can efficiently handle the schedulability problem for non-preemptive systems like NPU.

FIG. 25B illustrates a scheduling of NRT App as AI coaching corresponding to 10 FPS. FIG. 25C illustrates a scheduling of NRT App as a Face Detection app corresponding to 4 FPS. In such scenario, the RBS scheduler 1801 outputs the same as default NPU driver, i.e., FIFO.

The present subject matter's scheduling design may be used to handle various possible mixed User Interface (UX) scenarios where few models or tasks are running in background like AIS. Moreover, NRT tasks may be still executed without starvation.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for scheduling a Real Time (RT) task by an electronic device comprising a scheduler, the method comprising:

receiving, by a scheduler, a task request from an operating system (OS) runtime, the task request being defined by at least one RT task to be queued based on an enqueue-event trigger;

obtaining, by the scheduler, a yield time of the at least one RT task based on at least one of an execution deadline of the at least one RT task, an execution deadline of next RT task subsequent to the at least one RT task, and a maximum execution time associated with an execution of the next RT task subsequent to the at least one RT task;

creating, by the scheduler, a bandwidth reservation task having a deadline defined by the yield time for timing execution of the next RT task subsequent to the at least one RT task, the bandwidth reservation task being non-executable and being defined by a null execution time;

inserting, by the scheduler, the at least one RT task along with the bandwidth reservation task into a RT wait queue based on the deadline of each of the at least one RT task and the bandwidth reservation task in accordance with an Early Deadline First (EDF) criteria for enabling an EDF based scheduling; and scheduling, by the scheduler, an unscheduled task based on an available-time of the RT wait queue in accordance with the EDF based scheduling.

2. The method of claim 1, wherein the inserting, by the scheduler, the at least one RT task along with the bandwidth reservation task into the RT wait queue enables the scheduler to:

identify the RT wait queue and a Non Real Time (NRT) wait queue from a reservation bandwidth server of the scheduler;

perform a first level scheduling by prioritizing the RT wait queue over the NRT wait queue based on ascertaining presence of tasks in the RT wait queue;

perform a second level scheduling comprising one or more of:

scheduling the at least one RT task in accordance with the execution deadline of the at least one task within the RT wait queue;

receiving an unscheduled task-request for scheduling the unscheduled task comprising another RT task or an NRT task from the OS runtime, the unscheduled task request arriving at an instant corresponding to one or more of the bandwidth reservation task, an expired bandwidth reservation task, or an updated bandwidth reservation task within the wait queue; or executing a priority inversion within an available time of the RT wait queue by at least one of:

scheduling the another RT task within the available time of the RT wait queue if the execution deadline of the another RT task elapses before the deadline associated with the bandwidth reservation task, the available time of the RT wait queue defined by a slack time of the bandwidth reservation task; and scheduling the NRT task within the available time of the RT wait queue if the execution deadline of the NRT task elapses before the deadline associated with the bandwidth reservation task, wherein the available time of the RT wait queue is defined by a time of arrival of the unscheduled task request triggered by the enqueue event or an dequeue-event and computed based on a slack-time of the bandwidth reservation task, and a deadline associated with the unscheduled task.

3. The method of claim 2, further comprising:

receiving, by the scheduler from the OS runtime, a task-request defined by at least one Non Real Time (NRT) task to be queued based on the enqueue-event trigger; and inserting the at least one NRT task in an NRT wait queue for scheduling execution of the NRT task based on a time of arrival of the NRT task or a worst-case execution time of the NRT task.

4. The method of claim 1, wherein the bandwidth reservation task associated with the at least one RT task within the RT wait queue is a non-executable task comprising one or more of:

an arrival time identical to the at least one RT task;

a null execution time; or a deadline corresponding to a sum of an arrival time of the at least one RT task, the execution deadline of the at least one RT task, and the yield time.

5. The method of claim 1, further comprising:

receiving, by the scheduler, a task-request, from the OS runtime, as the next at least one RT task to be queued based on the enqueue-event trigger; and creating another bandwidth reservation task by updating the bandwidth reservation task associated with at least one preceding RT task, the another bandwidth reservation task being computed based on:

determining another yield time for the at least one next RT task; and updating the deadline of bandwidth reservation task with the another yield time for defining the deadline of the another bandwidth reservation task.

6. The method of claim 2, wherein the RT task or the NRT task arriving at the instant corresponding to the bandwidth reservation task within the RT wait queue corresponds to an executable task not present within the RT wait queue and corresponds to an unscheduled task.

7. The method of claim 3, further comprising:

identifying, by the scheduler, the RT wait queue and the NRT wait queue from a reservation bandwidth server of the scheduler;

scheduling, by the scheduler, tasks within the RT wait queue in accordance with the EDF scheduling;

submitting, by the scheduler, the at least one scheduled RT task or the one or more schedulable task associated with the available time for processing to a processing driver; and scheduling, by the scheduler, the tasks within the NRT wait queue based on a sequence within the NRT wait queue and based on the submitting the scheduled NRT task for processing to the processing driver.

8. The method of claim 7, wherein the scheduling, by the scheduler, tasks within the RT wait queue in accordance with the EDF scheduling comprises applying a priority inversion for scheduling one or more schedulable task in an available time of the RT wait queue as determined by a current time and from the event trigger corresponding to one of an enqueue or dequeue event, the available time delimited by an occurrence of the bandwidth reservation task within the RT wait queue, the schedulable task corresponding to the unscheduled task, and the RT wait queue being a priority based wait queue having a prioritization of tasks defined by an earlier deadline in accordance with EDF scheduling.

9. The method of claim 7, further comprising cancelling, by the scheduler, the at least one scheduled RT task upon determining the at least one scheduled RT task as being non-schedulable in accordance with the deadline associated with the at least one scheduled RT task.

10. The method of claim 7, further comprising cancelling, by the scheduler, the at least one scheduled NRT task upon determining the at least one scheduled NRT task as being non-schedulable in accordance with a corresponding maximum tardiness time associated with the NRT task.

11. The method of claim 7, wherein submitting the at least one scheduled RT task comprises:
applying an EDF scheduling upon the RT wait queue to ascertain a current task within the RT wait queue;
identifying the current task within the RT wait queue as the at least one RT task; and
submitting the at least one RT task to the processing driver based on a feasibility of scheduling, the feasibility at least being defined by conformance with the execution deadline of the at least one RT task.

12. The method of claim 7, wherein submitting the at least one scheduled RT task comprises:
applying an EDF scheduling upon the RT wait queue to ascertain a current task within the RT wait queue;
identifying the current task within the RT wait queue as the bandwidth reservation task;
submitting the schedulable RT task or the schedulable NRT task for execution by the processing driver within the available time of the RT wait queue, the schedulable task having an execution deadline before elapse of the yield time associated with the bandwidth reservation task; and
submitting NIL task within the available time of the RT wait queue, in a case of absence of the schedulable RT tasks and the NRT tasks.

13. The method of claim 7, wherein the scheduling the tasks within the NRT wait queue comprises:
scheduling the at least one NRT task based on a non-EDF based scheduling criteria associated with the NRT wait queue, the non-EDF based scheduling defined by one or more of Shortest Job First and FIFO; and
submitting the at least one scheduled NRT task for processing to the processing driver.

14. The method of claim 7, further comprising;
processing the at least submitted RT or NRT task by the processing driver through a processor hardware unit;
receiving a task-completion based interrupt from the processor hardware unit and invoking an interrupt handler forming a part of the processing driver; and
raising a task dequeue trigger by the processing driver to the scheduler based on the invoked interrupt handler, the trigger signaling corresponding to a completed execution of the submitted RT or NRT task and triggering the scheduler for selecting next task for submission as one or more of:
the bandwidth reservation task in the RT wait queue;
an unscheduled RT task;
an unscheduled NRT task
the next RT task in the RT wait queue;
a next NRT task in the NRT wait queue; or
a NIL task as determined by the scheduler.

15. The method of claim 11, further comprising:
determining an actual completion time of each completed task by a task profiler forming a part of the scheduler, the actual completion time corresponding to a difference between a scheduled time of the completed task and a finish time of the completed task;
logging the actual completion time of each completed task by the task profiler; and
optimizing one or more parameters of the scheduler for further scheduling of the RT and NRT task based on the logged actual completion time.

16. An electronic device comprising:
a processor; and
a scheduler coupled to the processor and configured to:
receive, from an operating system (OS) runtime, a task request defined by at least one Real Time (RT) task to be queued based on an enqueue event trigger;
obtain a yield time of the at least one RT task based on at least one of an execution deadline of the at least one RT task, an execution deadline of next RT task subsequent to the at least one RT task, and a maximum execution time associated with the execution of the next RT task subsequent to the at least one RT task;
create a bandwidth reservation task having a deadline defined by the yield time for timing execution of the next RT task subsequent to the at least one RT task, the bandwidth reservation task being non-executable and defined by a null execution time;
insert the at least one RT task along with the bandwidth reservation task into a RT wait queue based on the deadline of each of the at least one RT task and the bandwidth reservation task in accordance with an Early Deadline First (EDF) criteria for enabling an EDF based scheduling; and
schedule an unscheduled task based on an available time of the RT wait queue in accordance with the EDF based scheduling.

17. The electronic device of claim 16, wherein the inserting the at least one RT task along with the bandwidth reservation task into the RT wait queue enables the scheduler to:
identify the RT wait queue and a Non Real Time (NRT) wait queue from a reservation bandwidth server of the scheduler;
perform a first level scheduling by prioritizing the RT wait queue over the NRT wait queue based on ascertaining presence of tasks in the RT wait queue;
perform a second level scheduling comprising one or more of:
scheduling the at least one RT task in accordance with the execution deadline of the at least one task within the RT wait queue;
receiving an unscheduled task-request for scheduling the unscheduled task comprising another RT task or an NRT task from the OS runtime, the unscheduled task request arriving at an instant corresponding to one or more of the bandwidth reservation task, an expired bandwidth reservation task, or an updated bandwidth reservation task within the wait queue; or
executing a priority inversion within an available time of the RT wait queue by at least one of:
scheduling the another RT task within the available time of the RT wait queue if the execution deadline of the another RT task elapses before the deadline associated with the bandwidth reservation task, the available time of the RT wait queue defined by a slack time of the bandwidth reservation task; and
scheduling the NRT task within the available time of the RT wait queue if the execution deadline of the NRT task elapses before the deadline associated with the bandwidth reservation task, wherein the available time of the RT wait queue is defined by a time of arrival of the unscheduled task request triggered by the enqueue event or an dequeue-event and computed based on a slack-time of the bandwidth reservation task, and a deadline associated with the unscheduled task.

18. The electronic device of claim 17, wherein the scheduler is further configured to:
receive, from the OS runtime, a task-request defined by at least one Non Real Time (NRT) task to be queued based on the enqueue-event trigger; and
insert the at least one NRT task in an NRT wait queue for scheduling execution of the NRT task based on a time of arrival of the NRT task or a worst-case execution time of the NRT task.

19. The electronic device of claim 16, wherein the bandwidth reservation task associated with the at least one RT task within the RT wait queue is a non-executable task comprising one or more of:
an arrival time identical to the at least one RT task;
a null execution time; or
a deadline corresponding to a sum of an arrival time of the at least one RT task, the execution deadline of the at least one RT task, and the yield time.

20. The electronic device of claim 16, wherein the scheduler is further configured to:
receive a task-request, from the OS runtime, as the next at least one RT task to be queued based on the enqueue-event trigger; and
create another bandwidth reservation task by updating the bandwidth reservation task associated with at least one preceding RT task, the another bandwidth reservation task being computed based on:
determining another yield time for the at least one next RT task; and
updating the deadline of bandwidth reservation task with the another yield time for defining the deadline of the another bandwidth reservation task.

* * * * *